United States Patent
Ramasubramanian et al.

(10) Patent No.: US 9,619,270 B2
(45) Date of Patent: Apr. 11, 2017

(54) REMOTE-DIRECT-MEMORY-ACCESS-BASED VIRTUAL MACHINE LIVE MIGRATION

(71) Applicant: VMWARE, INC., Palo Alto, CA (US)

(72) Inventors: Manikandan Ramasubramanian, Bangalore (IN); Mukheem Ahmed, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/835,762

(22) Filed: Aug. 26, 2015

(65) Prior Publication Data

US 2016/0378530 A1    Dec. 29, 2016

(30) Foreign Application Priority Data

Jun. 27, 2015 (IN) .......................... 3248/CHE/2015

(51) Int. Cl.
*G06F 9/455* (2006.01)

(52) U.S. Cl.
CPC .. *G06F 9/45558* (2013.01); *G06F 2009/4557* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | |
|---|---|---|
| 2005/0120160 A1 | 6/2005 | Plouffe et al. |
| 2010/0107159 A1 | 4/2010 | Radhakrishnan et al. |
| 2012/0131259 A1 | 5/2012 | Baskakov et al. |
| 2012/0254860 A1 | 10/2012 | Bozek et al. |
| 2013/0275708 A1 | 10/2013 | Doi |

*Primary Examiner* — Craig Dorais

(57) ABSTRACT

The current document is directed to methods and systems for moving executing virtual machines between host systems in a virtual data center. In described implementations, remote-direct memory access is used for transferring memory contents and, in certain implementations, additional data between the host systems to facilitate live migration of virtual machines. To provide increased efficiency, transfer of the contents of a shared memory page from a source host system to target host system during migration of a virtual machine is deferred until the relocated virtual machine attempts to write to the shared memory page.

18 Claims, 34 Drawing Sheets

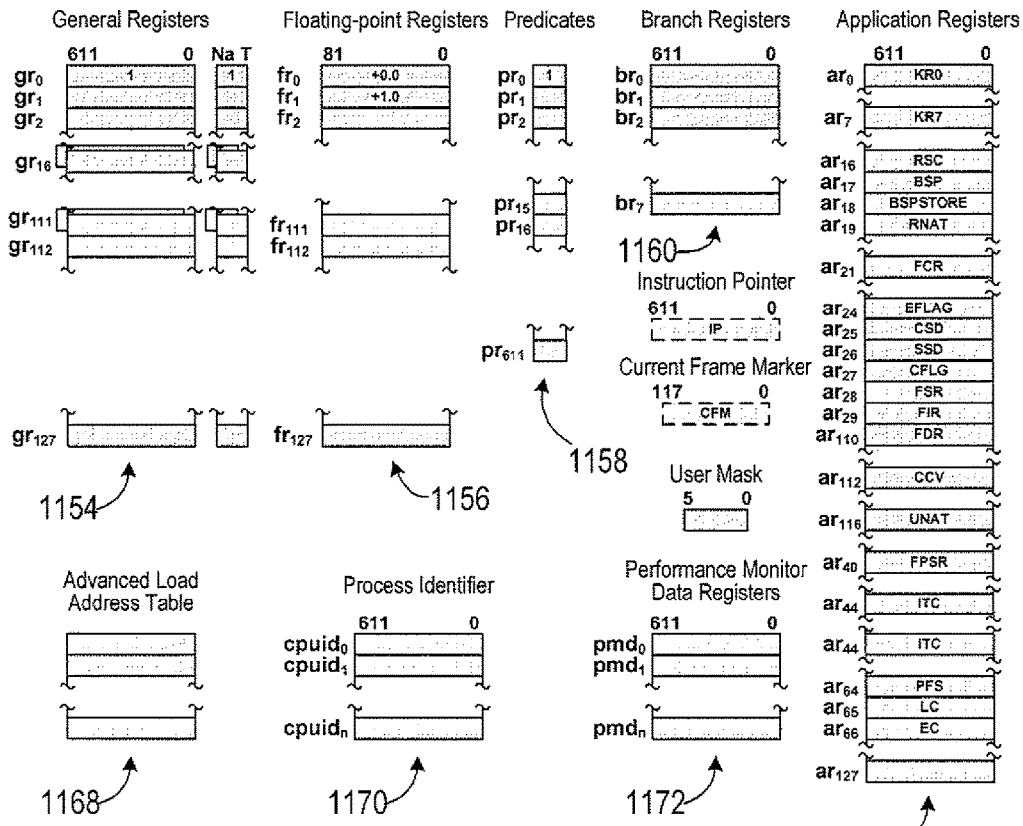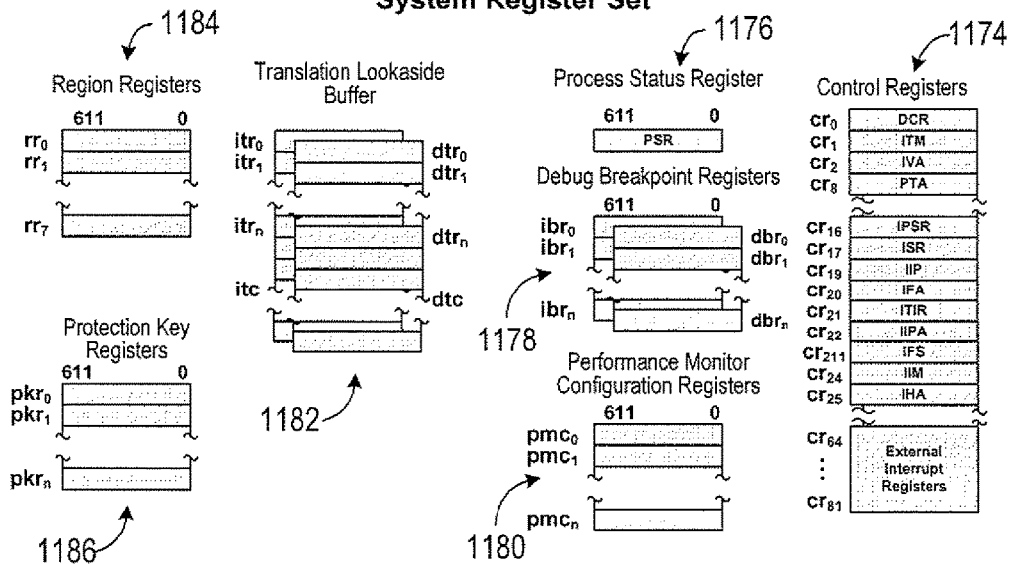
FIG. 11B

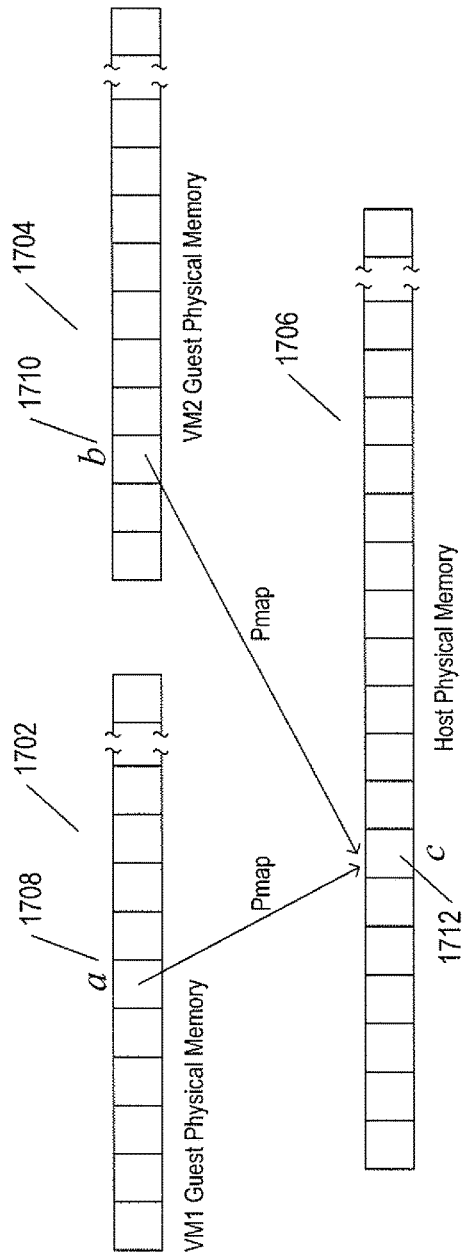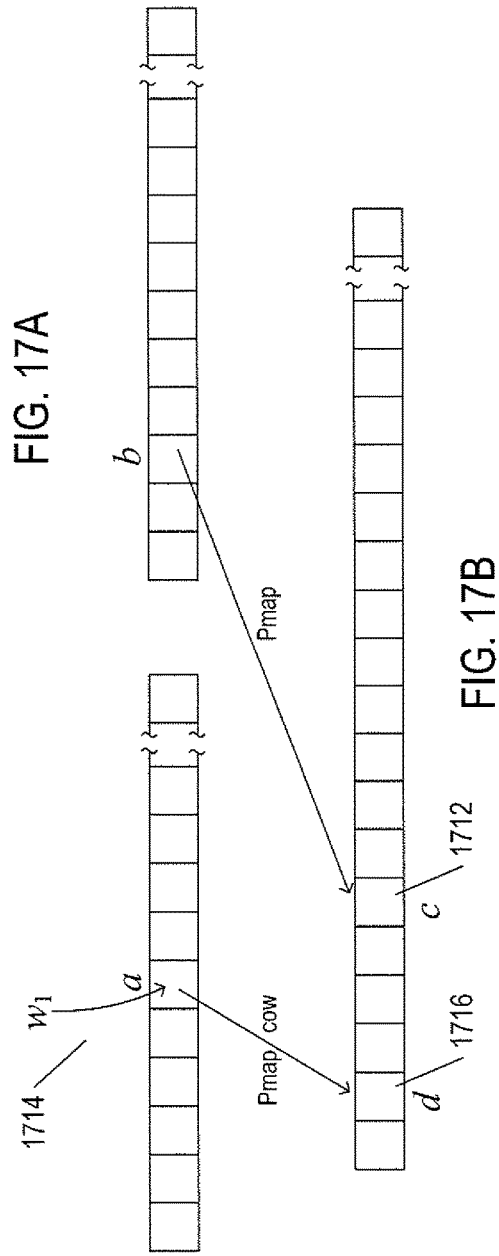

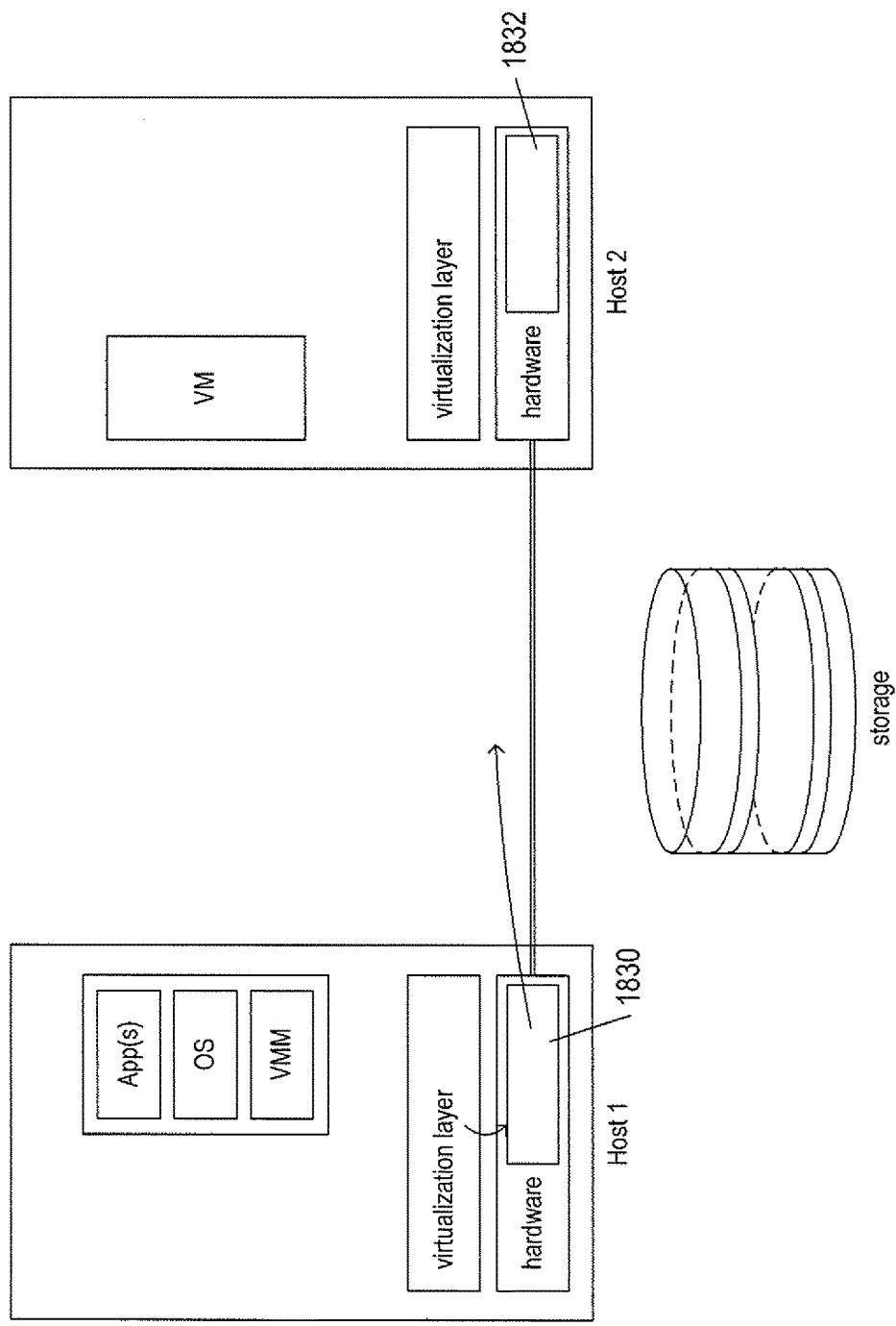

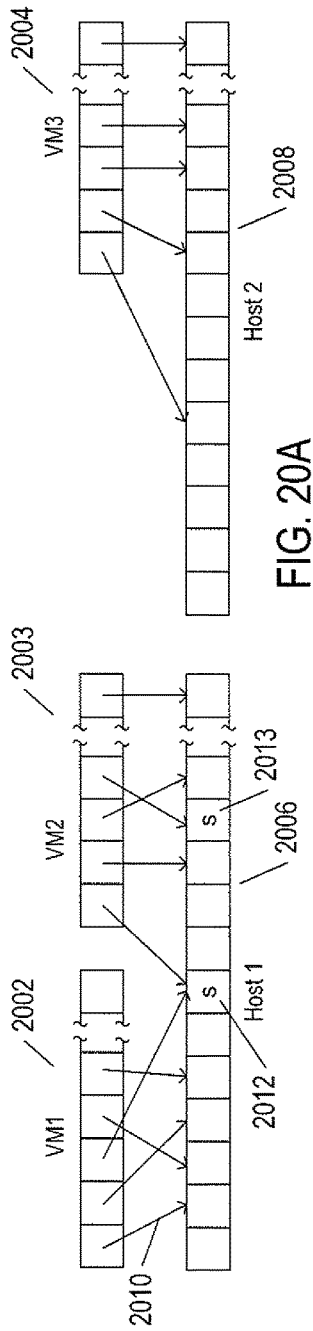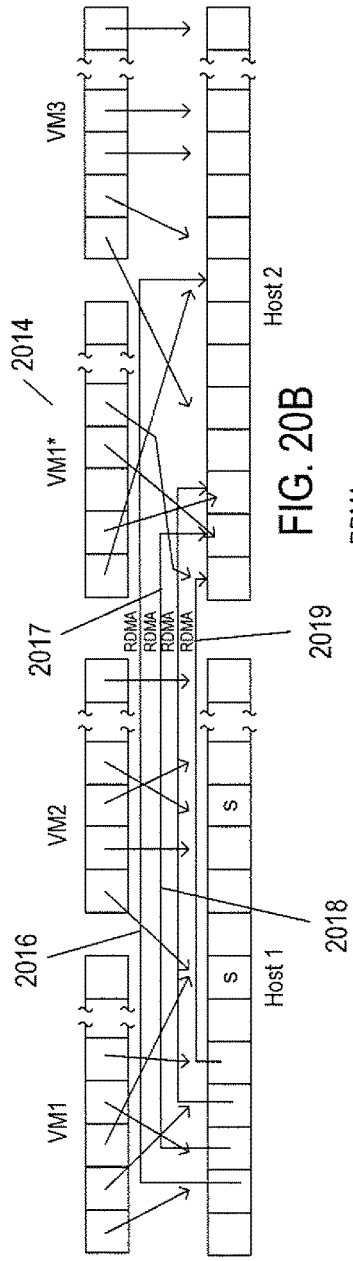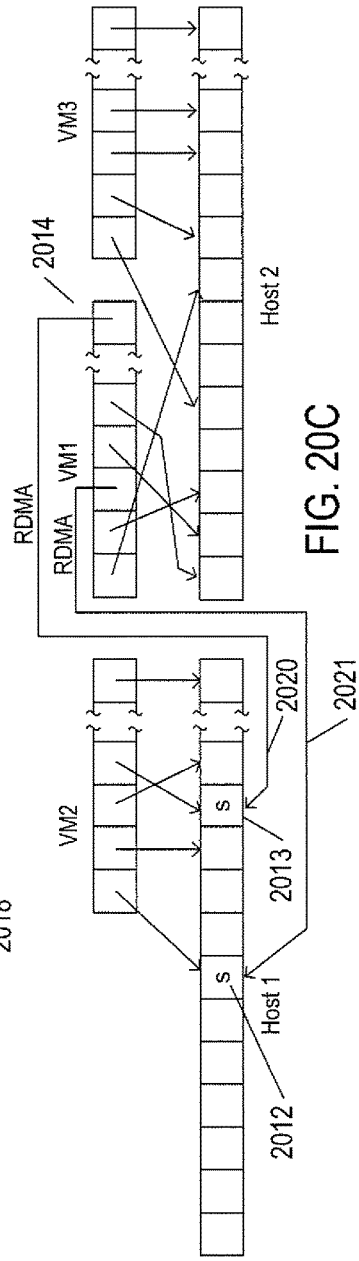
FIG. 20A
FIG. 20B
FIG. 20C

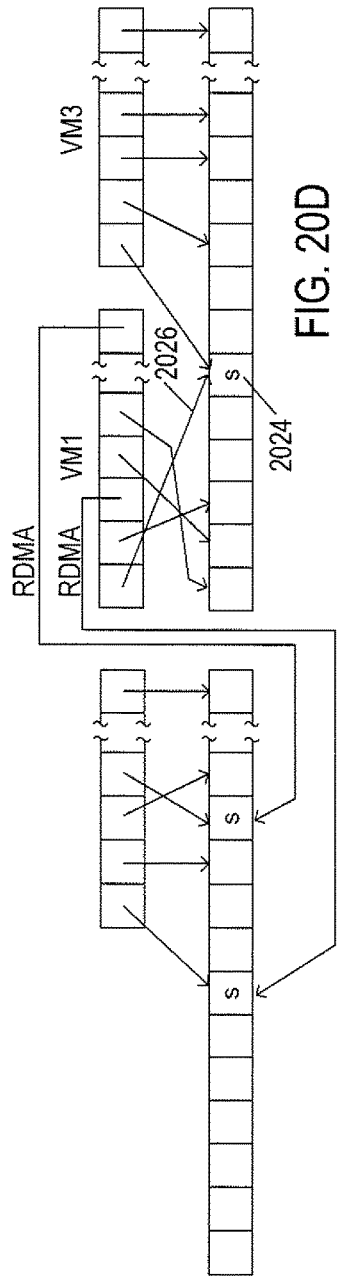
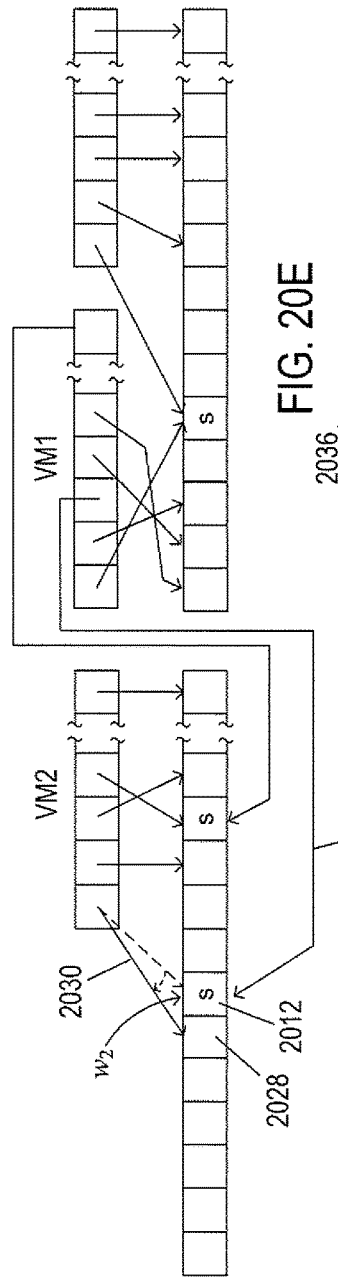
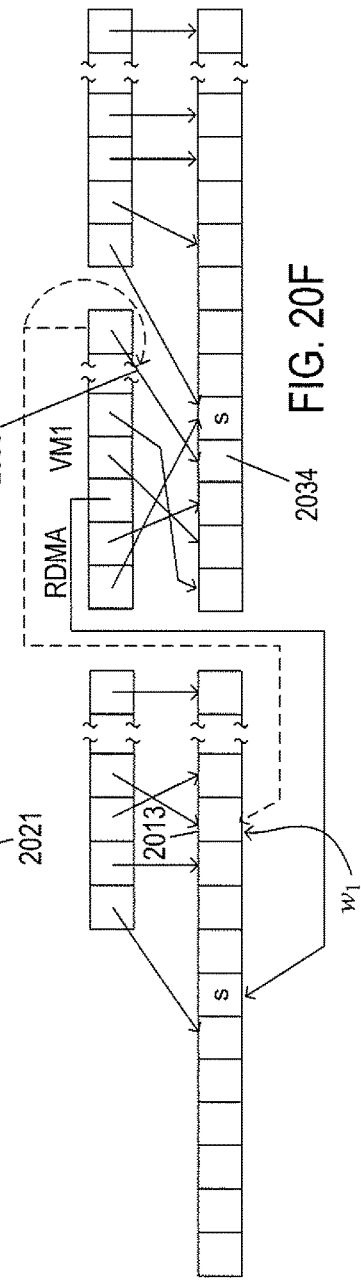
FIG. 20D
FIG. 20E
FIG. 20F

REMOTE-DIRECT-MEMORY-ACCESS-BASED VIRTUAL MACHINE LIVE MIGRATION

RELATED APPLICATIONS

Benefit is claimed under 35 U.S.C. 119(a)-(d) to Foreign application Serial No. 3248/CHE/2015 filed in India entitled "REMOTE-DIRECT-MEMORY-ACCESS-BASED VIRTUAL MACHINE LIVE MIGRATION", on Jun. 27, 2015, by VMware, Inc., which is herein incorporated in its entirety by reference for all purposes.

TECHNICAL FIELD

The current document is directed to management of virtualized, distributed computer systems and, in particular, to methods and systems that employ remote-direct memory access to facilitate movement of executing virtual machines between host systems.

BACKGROUND

Early computer systems were monolithic, single-processor systems that executed only a single task at each point in time. The early computer systems lacked operating systems and basic programming facilities such as assemblers and compilers. During the first several decades of the computer revolution, many of the basic single-system components of computer systems were developed and evolved to produce capable, operating-system-controlled, multi-tasking computer systems. For another decade, rapid evolution of processor technology, data-storage technologies, memory, and communications technologies led to dramatic increases in the capabilities and capacities of single-processor computer systems. Ultimately, however, in order to achieve even greater capabilities and capacities, computer-system designers turned to multi-processor systems and then to more complex, distributed computing systems comprising aggregations of many intercommunicating computer systems. This turn towards distributed computing was facilitated by the development of distributed locking methods for controlling access to distributed computing resources, distributed operating systems, and high-bandwidth electronic communications. During the past few decades, extremely large cloud-computing facilities have been developed and commercialized to the point that computational bandwidth and data-storage capacity are provided to customers of large cloud-computing providers much as electrical power and water are provided to customers of utility companies. Cloud-computing facilities often employ hundreds, thousands, or more networked and often geographically distributed multi-processor servers that are controlled, by virtualization technology, to produce hierarchical layers of virtualized computing facilities.

Virtual data centers and other virtual data structures are generally implemented on large physical distributed computing systems, including computing systems that employ a management sever to manage a large number of remote host systems. Management servers, in cooperation with host systems, have been designed to move executing virtual machines between host systems, with minimal interruption in virtual-machine execution, on the order of less than one second to a few seconds, in order to facilitate high availability, fault tolerance, load balancing, and other features of robust and efficient virtual data centers. However, copying memory and swap files between host systems during virtual machine migration may be an expensive, temporary overhead, consuming significant processor bandwidth. Designers and developers of distributed computer systems continue to seek methods and systems to more efficiently implement live migration of virtual machines.

SUMMARY

The current document is directed to methods and systems for moving executing virtual machines between host systems in a virtual data center. In described implementations, remote-direct memory access is used for transferring memory contents and, in certain implementations, additional data between the host systems to facilitate live migration of virtual machines. To provide increased efficiency, transfer of the contents of a shared memory page from a source host system to target host system during migration of a virtual machine is deferred until the relocated virtual machine attempts to write to the shared memory page.

BRIEF DESCRIPTION OF THE DRAWINGS

In FIG. 9, three different physical data centers 902-904 are shown below planes representing the cloud-director layer of abstraction 906-908.

FIGS. 11A-B show the registers within an Itanium processor.

FIGS. 17A-B illustrate transparent page sharing.

FIGS. 18A-E illustrate the VMotion operation.

FIGS. 20A-F illustrate handling of shared pages by RDMA-based VMotion.

DETAILED DESCRIPTION OF EMBODIMENTS

Figure 1:
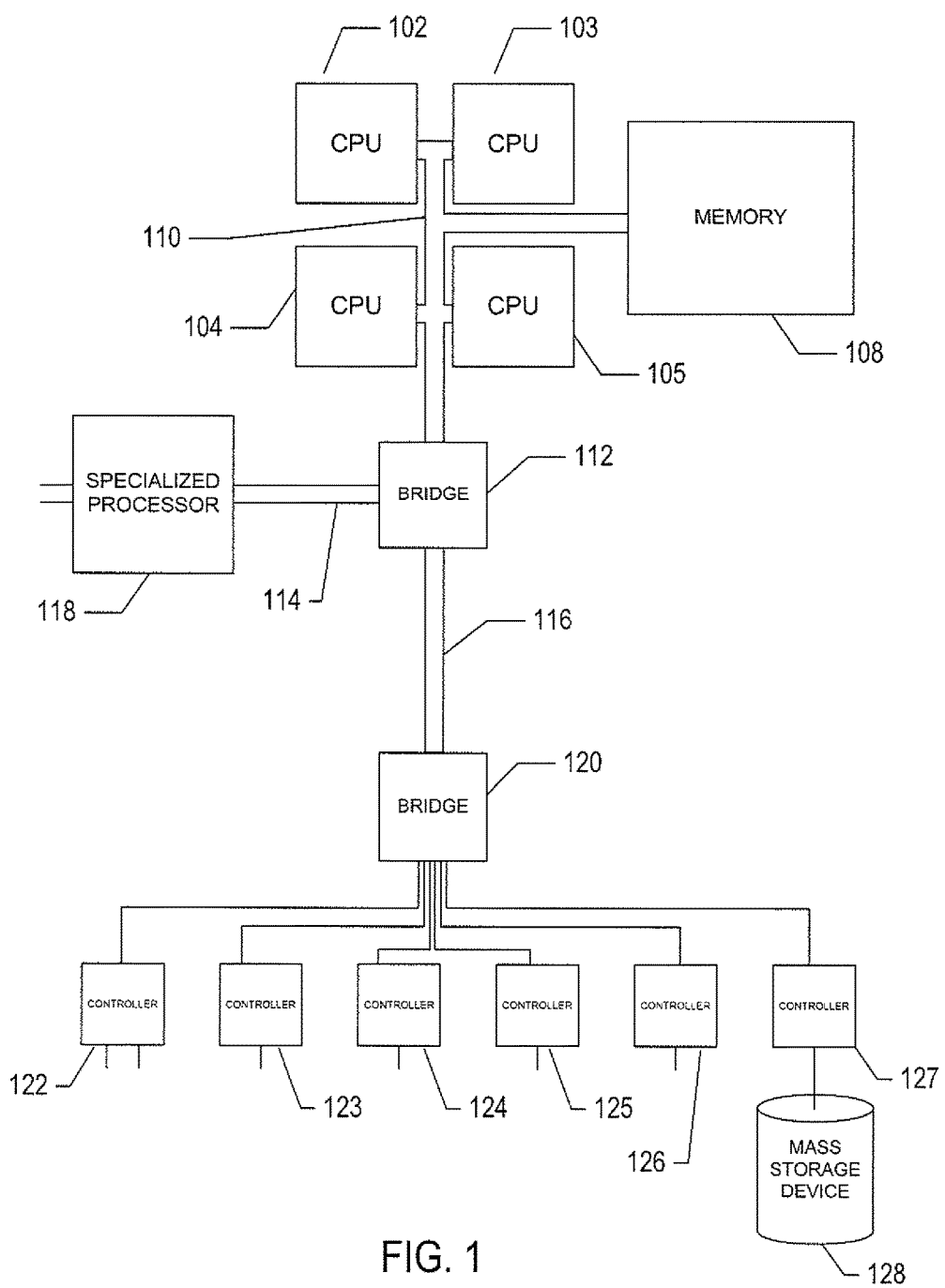
FIG. 1 provides a general architectural diagram for various types of computers.

The current document is directed to methods and systems for moving executing virtual machines between host systems in a virtual data center. In a first subsection, below, a detailed description of computer hardware, complex computational systems, and virtualization is provided with reference to FIGS. 1-14. In a second subsection, remote-direct memory access ("RDMA") is discussed with reference to FIGS. 15A-B. Implementations of the currently disclosed methods and systems are discussed in a third subsection, with reference to FIGS. 16-22B.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
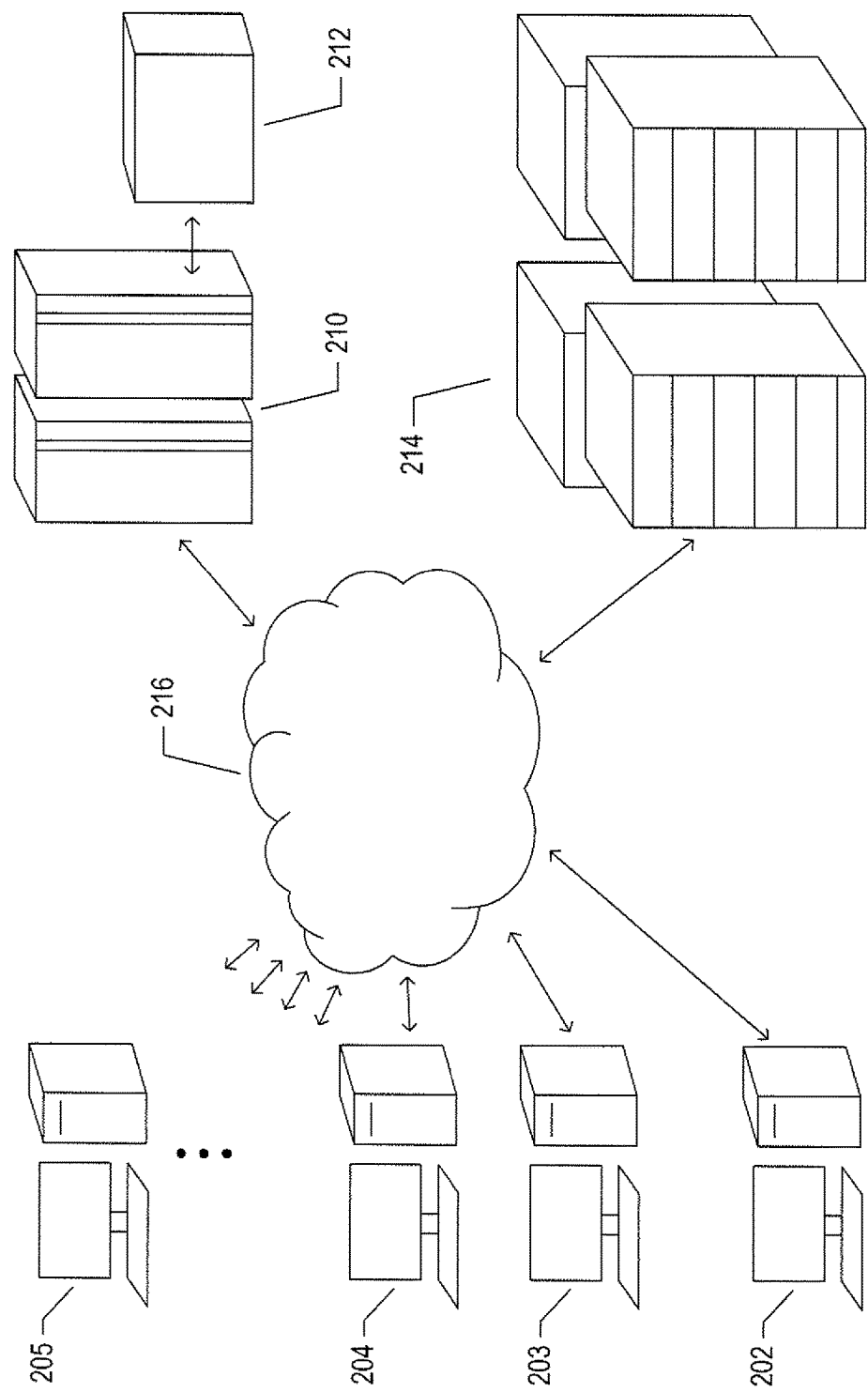
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
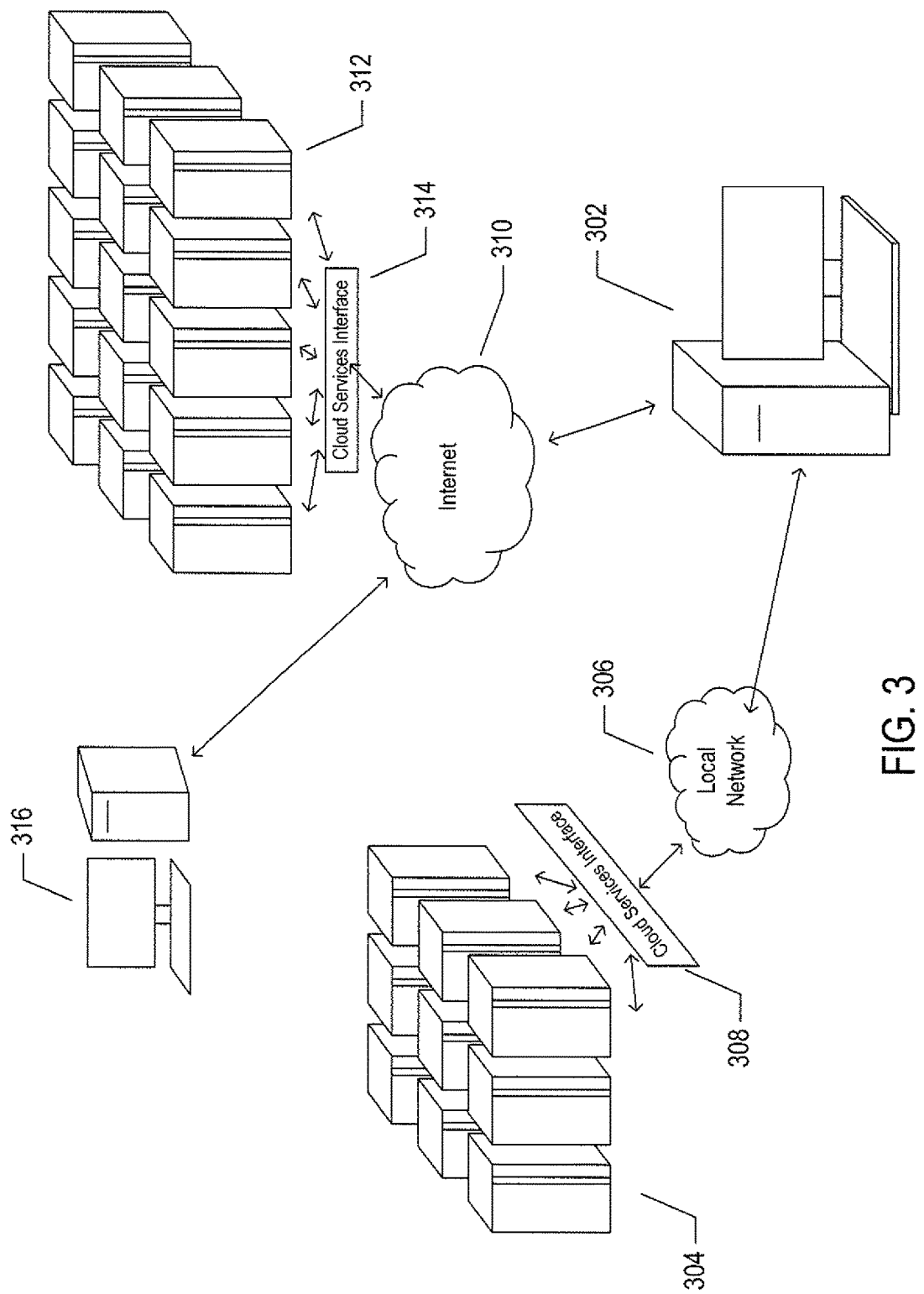
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
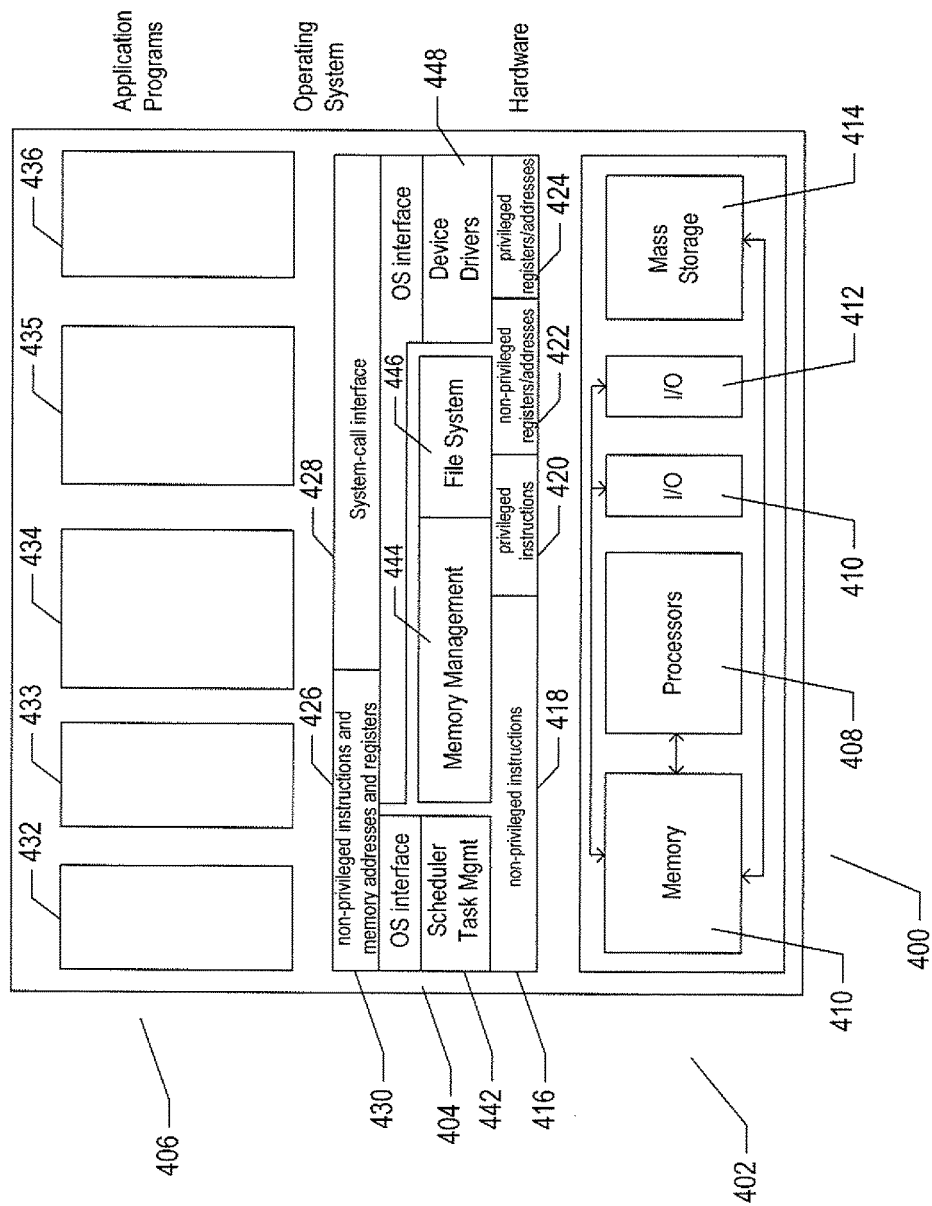
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
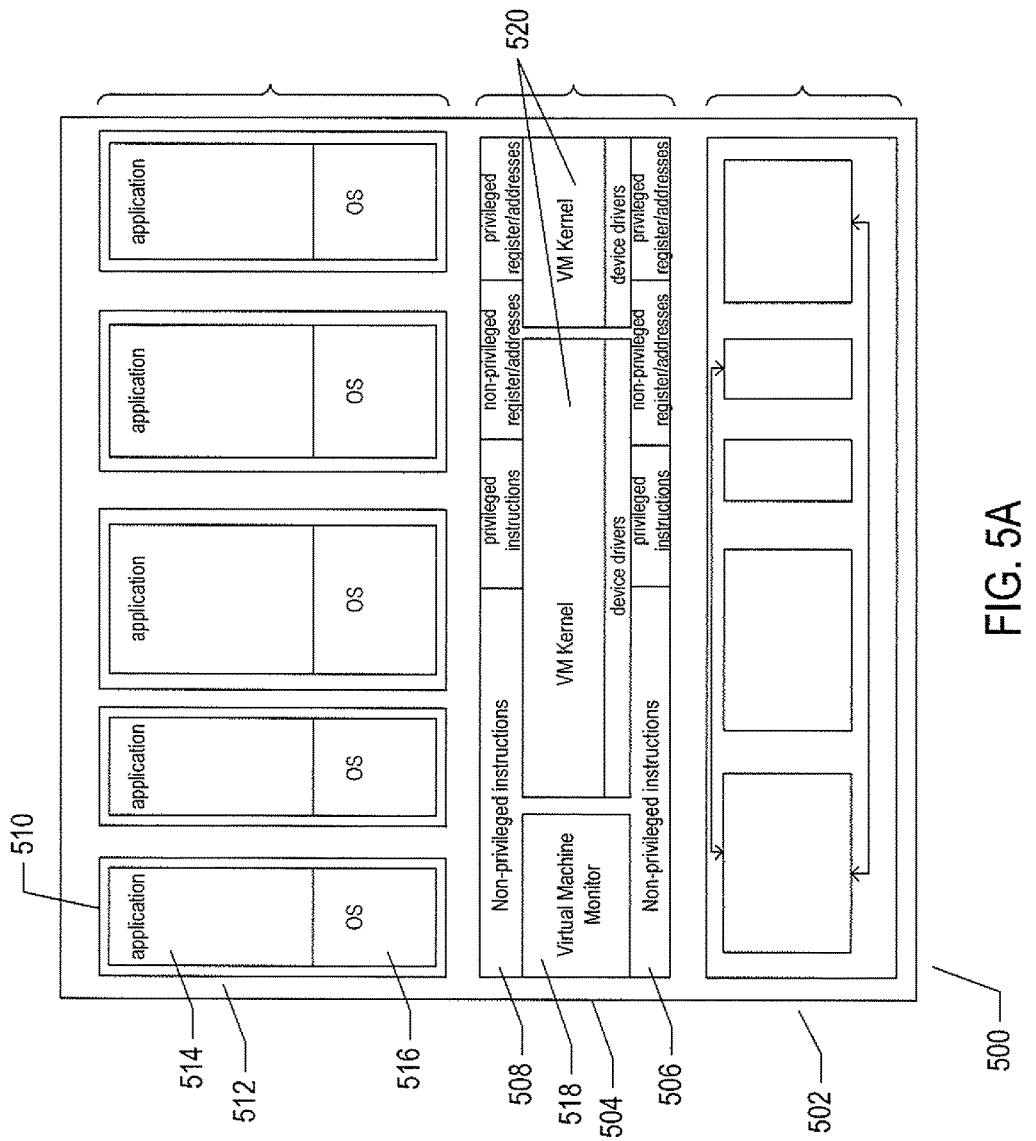
FIGS. 5A-B illustrate two types of virtual machine and virtual-machine execution environments.
Figure 5B:
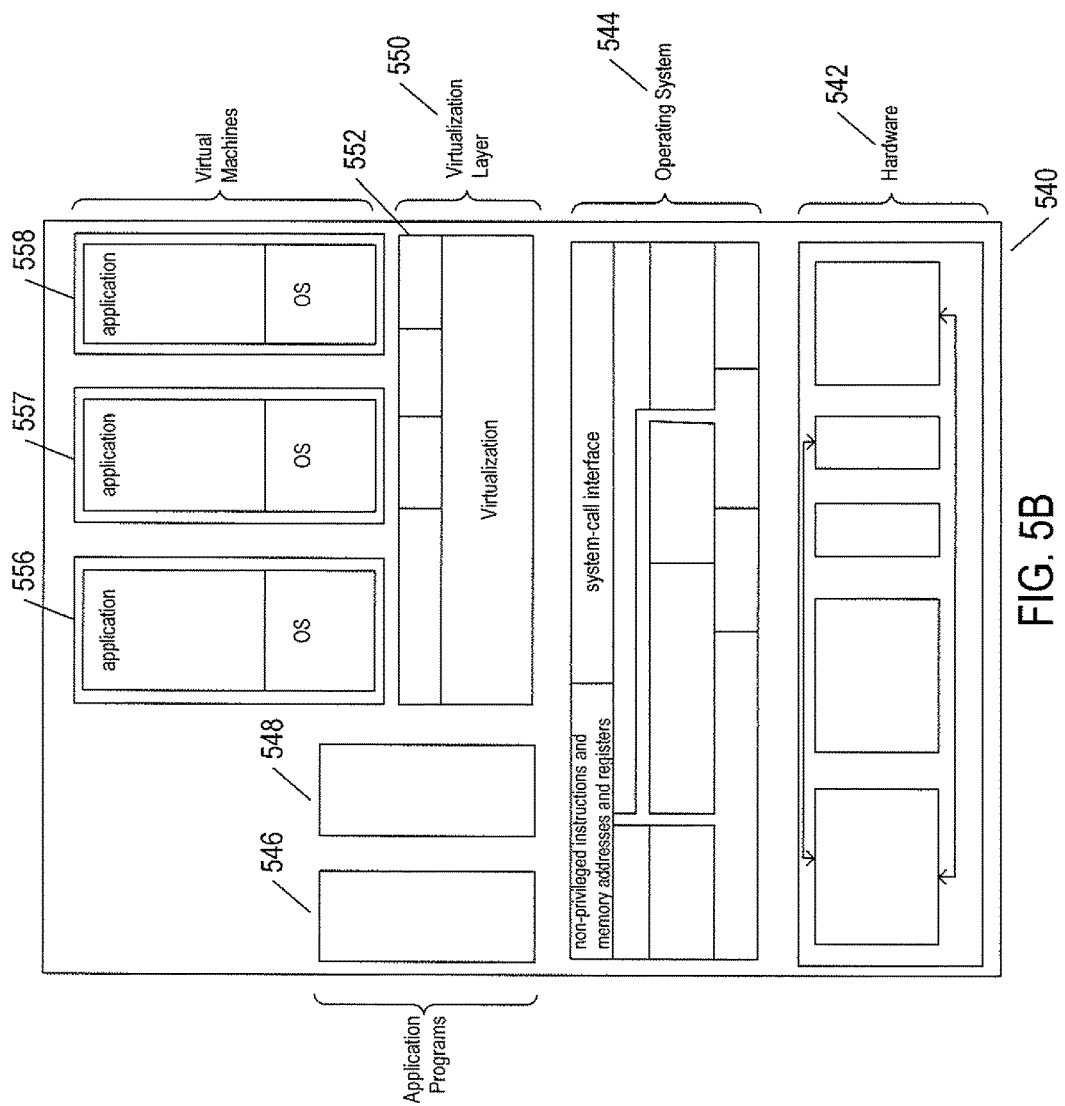

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
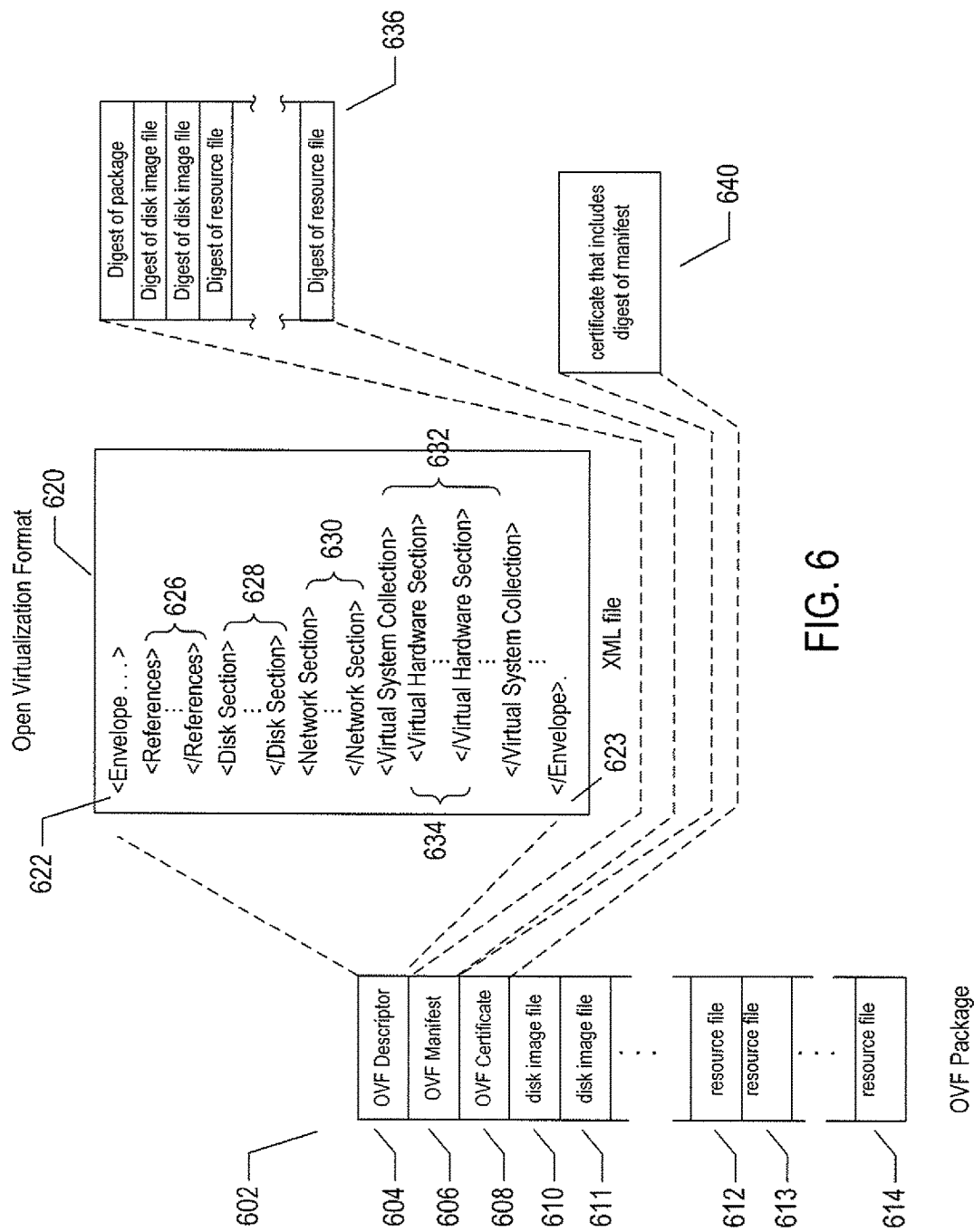
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
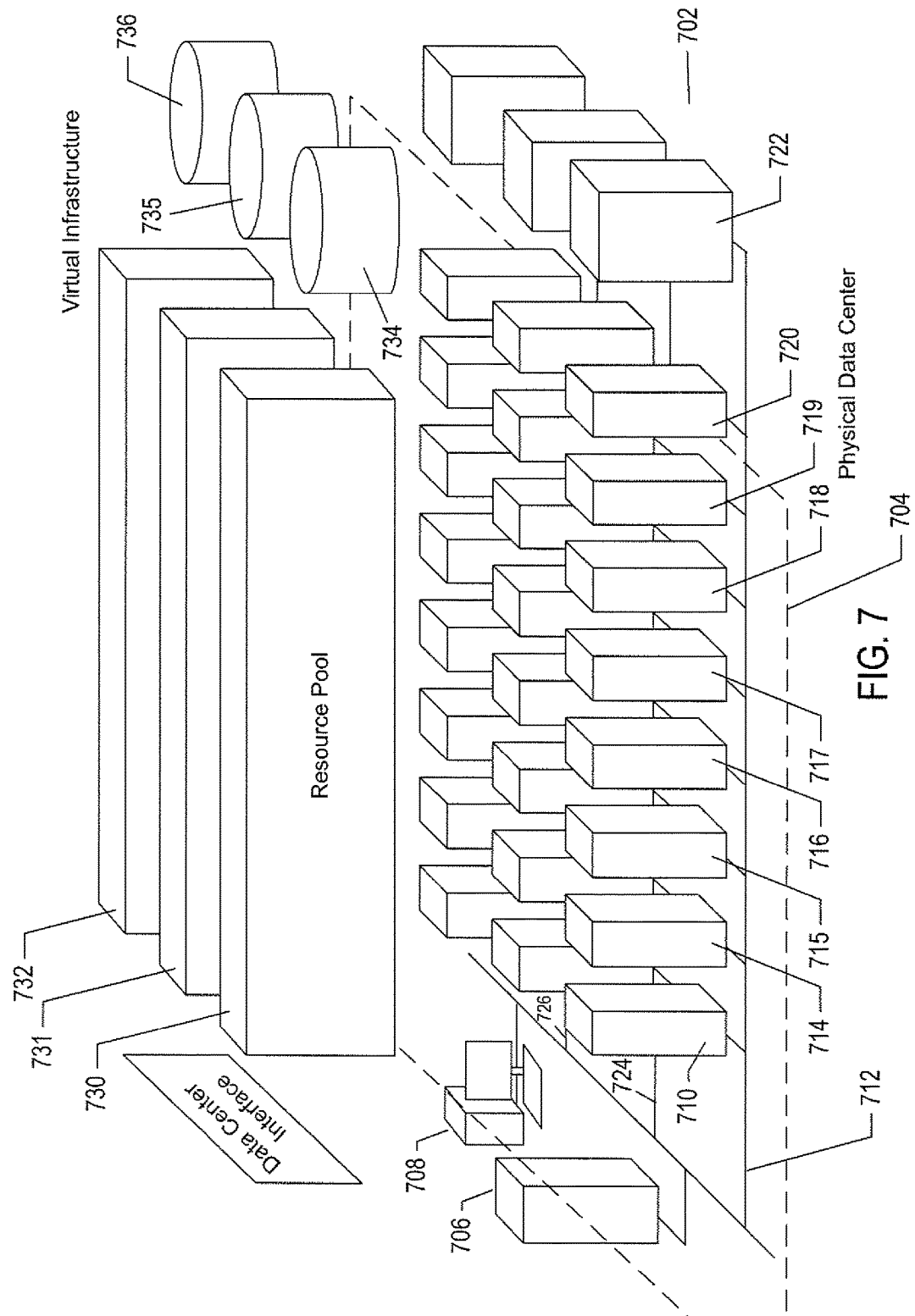
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
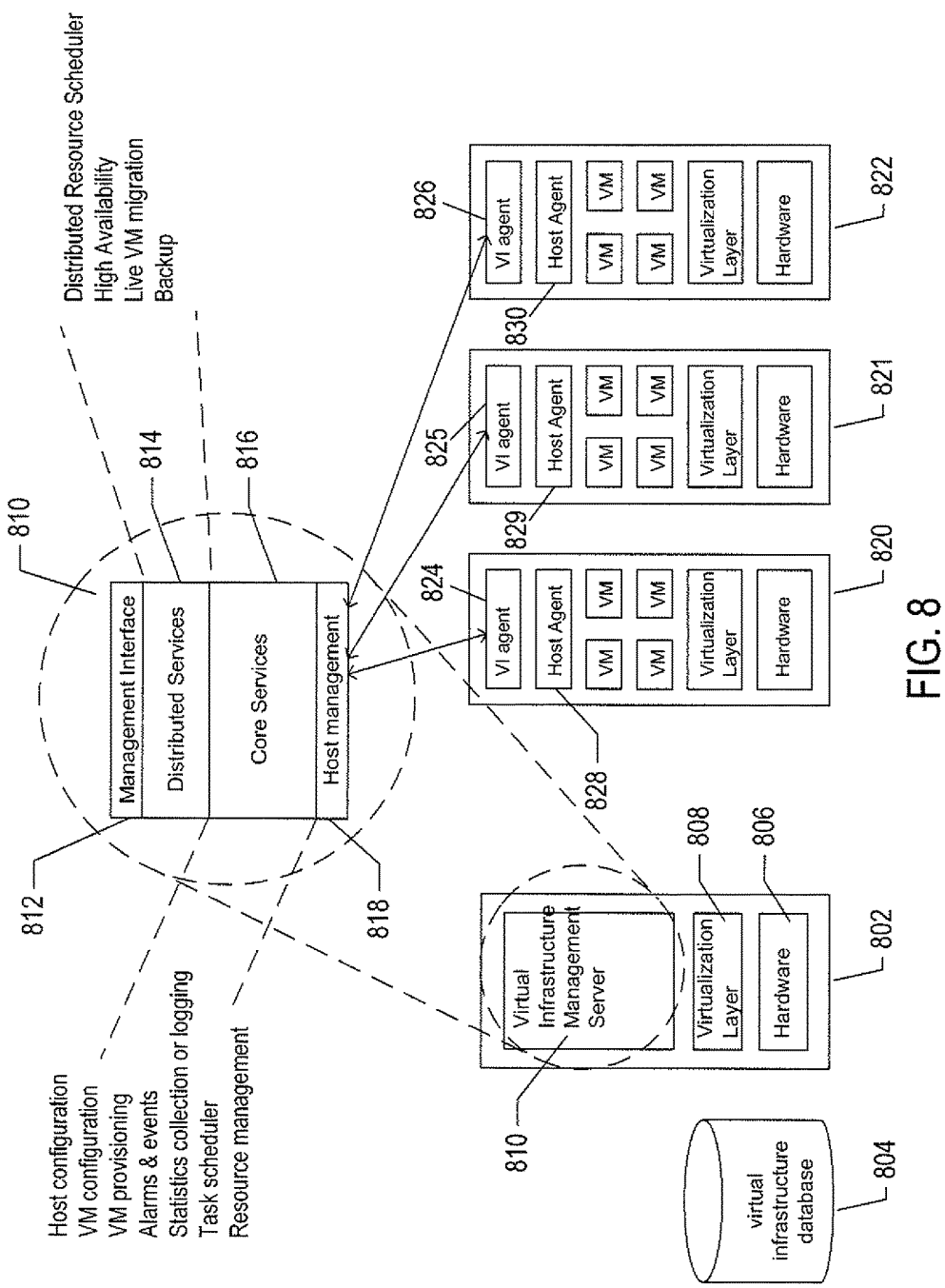
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC, 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, transmits the stored data and memory associated with the virtual machine to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
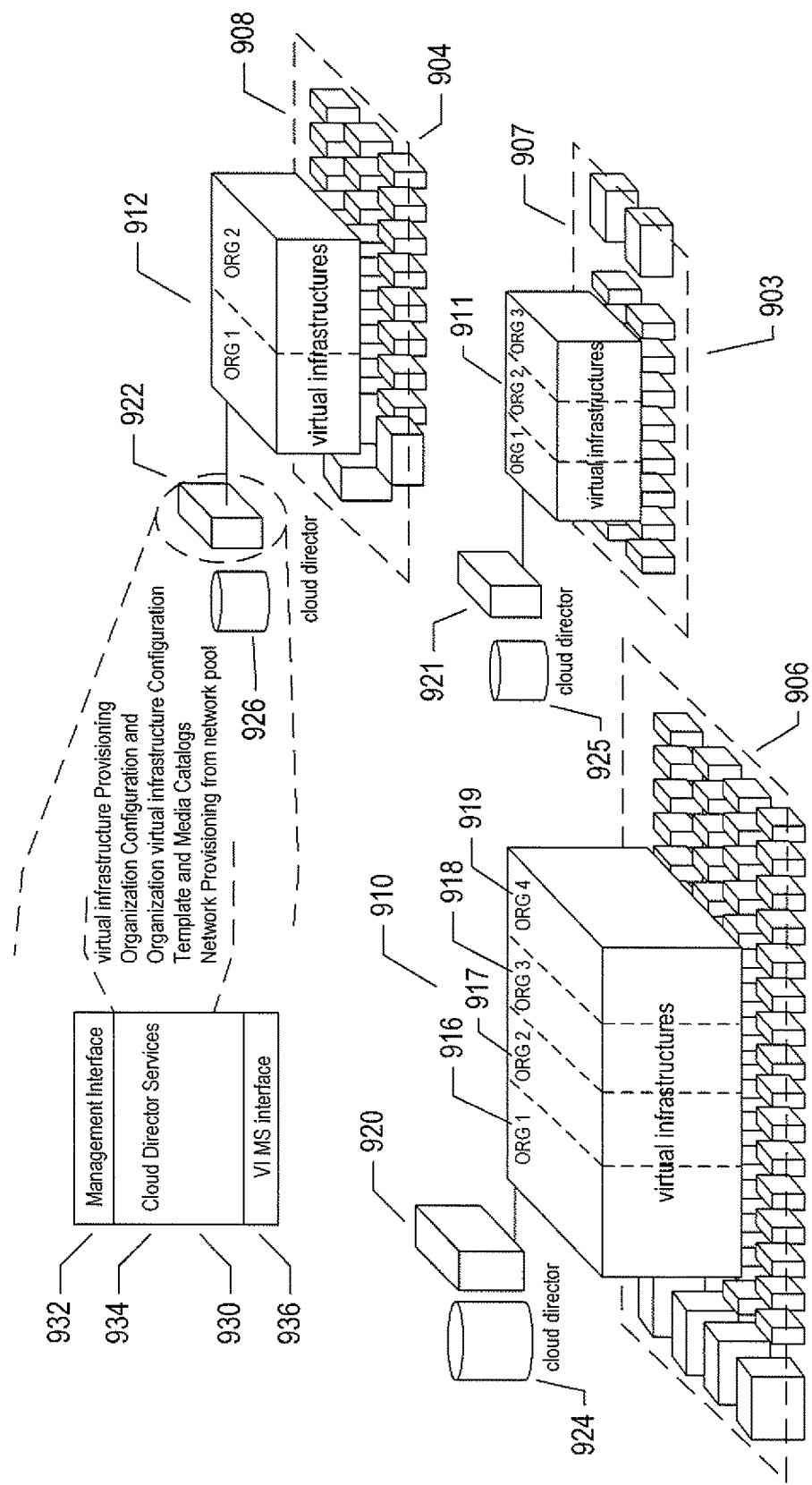
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
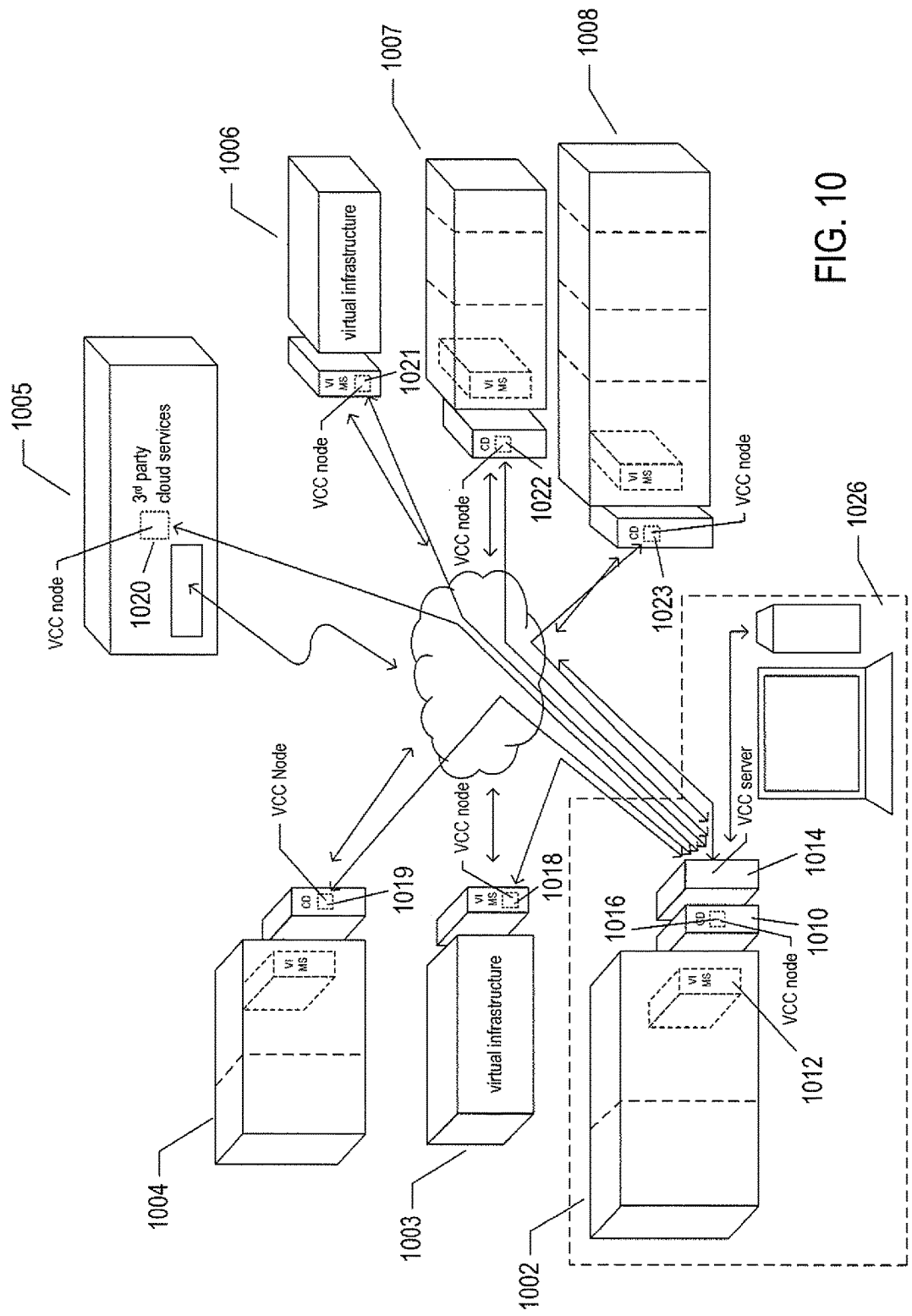
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Processor Architecture

Processors, such as Intel Itanium® processors, are the fundamental computational component of a modern computer hardware platform that supports a virtualization layer that, in turn, supports multiple guest-operating-systems, in part by providing a virtual physical memory and virtual-address translation facilities to each guest operating system. Various different types of processors have different types of architectures and support for virtual memory. The Intel Itanium® processor architecture is used as an example, in the current discussion, of a modern processor architecture.

Figure 11A:
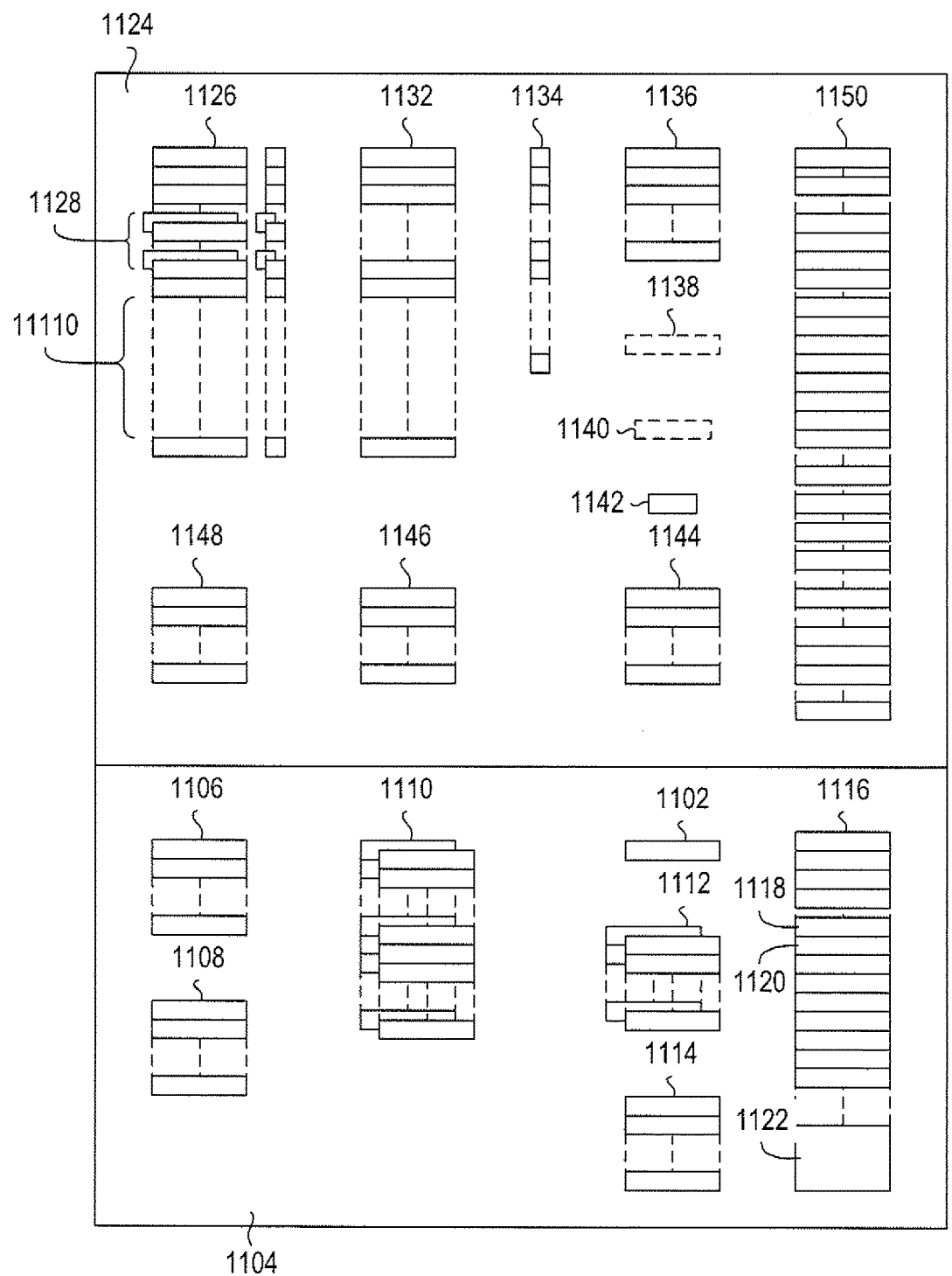

FIGS. 11A-B show the registers within an Itanium processor. FIG. 11A is a block diagram showing the registers within the processor. The registers hold values that define the execution state of the processor, and, when saved to memory, capture the machine state of an executing process prior to stopping execution of the process. Restoring certain registers saved in memory allows for resumption of execution of an interrupted process. The register set shown in FIGS. 11A-B is quite complex, and only certain of the registers are described, below.

The process status register ("PSR") 1102 is a 64-bit register that contains control information for the currently executing process. The PSR comprises many bit fields, including a 2-bit field that contains the current privilege level ("CPL") at which the currently executing process is executing. There are four privilege levels: 0, 1, 2, and 3. The most privileged privilege level is privilege level 0. The least privileged privilege level is privilege level 3. Only processes executing at privilege level 0 are allowed to access and manipulate certain machine resources, including the subset of registers, known as the "system-register set," shown in FIG. 11A within the lower rectangle 1104. One control register, the interruption processor status register ("IPSR") 1118, stores the value of the PSR for the most recently interrupted process. The interruption status register ("ISR") 1120 contains a number of fields that indicate the nature of the interruption that most recently occurred to an interruption handler when the PSR.ic field flips from "1," at the time of a fault or interrupt, to "0" as the interruption handler is invoked. Other control registers store information related to other events, such as virtual memory address translation information related to a virtual address translation fault, pointers to the last successfully executed instruction bundle, and other such information. Sets of external interrupt control registers 1122 are used, in part, to set interrupt vectors. The IHA register stores an indication of a virtual hash page table location at which the virtual-address translation corresponding to a faulting virtual address should be found.

The registers shown in FIG. 11A in the upper rectangular region 1124 are known as the "application-register set." These registers include a set of general registers 1126, sixteen of which 1128 are banked in order to provide immediate registers for interruption handling code. At least 96 general registers 1130 form a general-register stack, portions of which may be automatically stored and retrieved from backing memory to facilitate linkages among calling and called software routines. The application-register set also includes floating point registers 1132, predicate registers 1134, branch registers 1136, an instruction pointer 1138, a current frame marker 1140, a user mask 1142, performance monitor data registers 1144, processor identifiers 1146, an advanced load address table 1148, and a set of specific application registers 1150.

FIG. 11B shows another view the registers provided by the Itanium architecture, including the 128 64-bit general purpose registers 1154, a set of 128 82-bit floating point registers 1156, a set of 64 predicate registers 1158, a set of 64 branch registers 1160, a variety of special purpose registers including application registers ("AR") $AR_0$ through $AR_{127}$ 1166, an advance load address table 1168, process-identifier registers 1170, performance monitor data registers 1172, the set of control registers ("CR") 1174, ranging from $CR_0$ to $CR_{81}$, the PSR register 1176, break point registers 1178, performance monitor configuration registers 1180, a translation lookaside buffer 1182, region registers 1184, and protection key registers 1186. Note that particular AR registers and CR registers have acronyms that reflect their use. For example, AR register $AR_{17}$ 1188, the backing-store-pointer register, is associated with the acronym BSP, and this register may be alternatively specified as the BSP register or the AR[BSP] register. In many of the registers, single bits or groups of bits comprise fields containing values with special meanings. For example, the two least significant bits within register AR[RSC] 1190 together compose a mode field which controls how aggressively registers are saved and restored by the processor. These two bits can be notationally specified as "AR[RSC].mode."

Figure 12:
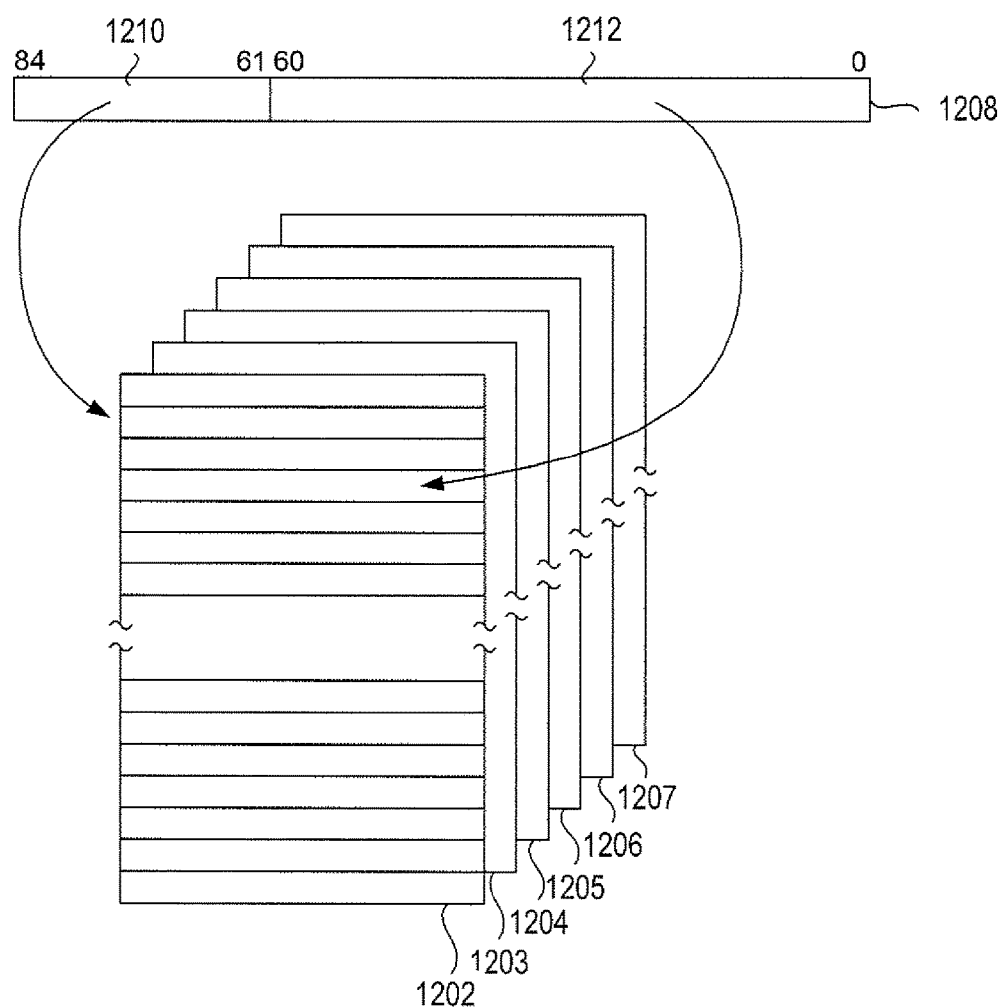
FIG. 12 illustrates the virtual address space provided by one modern computer architecture.
Figure 13:
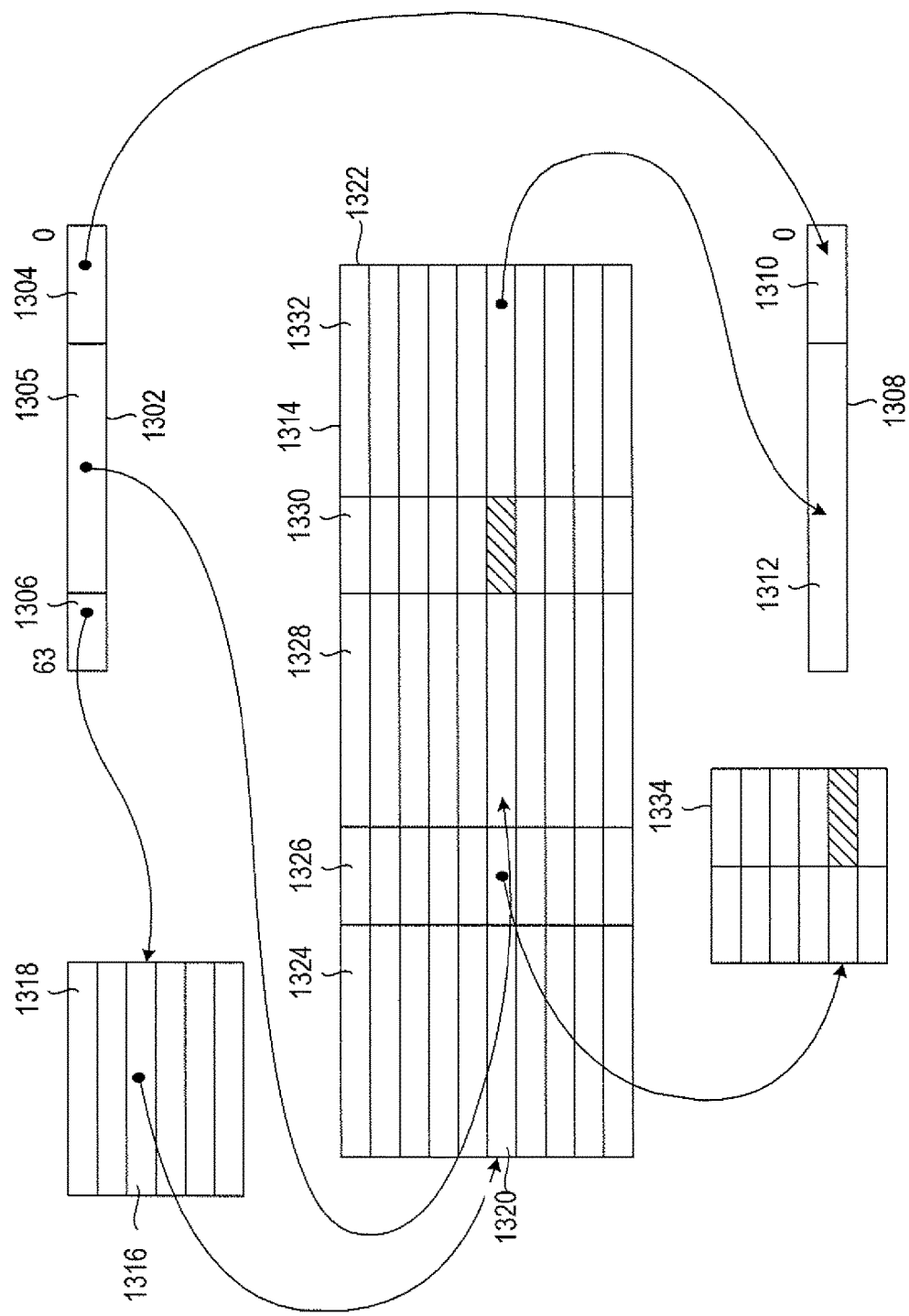
FIG. 13 illustrates translation of a virtual memory address into a physical memory address via information stored within region registers, protection key registers, and a translation look-aside buffer.

The memory and virtual-address-translation architecture of the Itanium computer architecture is described below, with references to FIGS. 12-14. The virtual address space defined within the Intel Itanium computer architecture includes $2^{24}$ regions, such as regions 402-407 shown in FIG. 4, each containing $2^{61}$ bytes that are contiguously addressed by successive virtual memory addresses. Thus, the virtual memory address space can be considered to span a total address space of $2^{85}$ bytes of memory. An 85-bit virtual memory address 1208 can then be considered to comprise a 24-bit region field 1210 and a 61-bit address field 1212.

In general, however, virtual memory addresses are encoded as 64-bit quantities. FIG. 13 illustrates translation of a 64-bit virtual memory address into a physical memory address via information stored within region registers, protection key registers, and a translation look-aside register buffer ("TLB"). In the Intel® Itanium architecture, virtual addresses are 64-bit computer words, represented in FIG. 13 by a 64-bit quantity 1302 divided into three fields 1304-1306. The first two fields 1304 and 1305 have sizes that depend on the size of a memory page, which can be adjusted within a range of memory page sizes. The first field 1304 is referred to as the "offset." The offset is an integer designating a byte within a memory page. When, for example, a memory page contains 4096 bytes, then the offset needs to contain 12 bits to represent the values 0-4095. The second field 1305 contains a virtual page address. The virtual page address designates a memory page within a virtual address space that is mapped to physical memory, and further backed up by memory pages stored on mass storage devices, such as disks. The third field 1306 is a three-bit field that designates a region register containing the identifier of a region of virtual memory in which the virtual memory page specified by the virtual page address 1305 is contained.

One possible virtual-address-translation implementation consistent with the Itanium architecture is next discussed. Translation of the virtual memory address 1302 to a physical memory address 1308 that includes the same offset 1310 as the offset 1304 in the virtual memory address, as well as a physical page number 1312 that references a page in the physical memory components of the computer system, is carried out by the processor, at times in combination with operating-system-provided services. When a translation from a virtual memory address to a physical memory address is contained within the TLB 1314, then the virtual-memory-address-to-physical-memory-address translation can be entirely carried out by the processor without operating system intervention. The processor employs the region register selector field 1306 to select a register 1316 within a set of region registers 1318. The selected region register 1316 contains a 24-bit region identifier. The processor uses the region identifier contained in the selected region register and the virtual page address 1305 together in a hardware function to select a TLB entry 1320 containing a region identifier and virtual memory address that match the region identifier contained in the selected region register 1316 and the virtual page address 1305. Each TLB entry, such as TLB entry 1322, contains fields that include a region identifier 1324, a protection key associated with the memory page described by the TLB entry 1326, a virtual page address 1328, privilege and access mode fields that together compose an access rights field 1330, a dirty bit to indicate that the page has been modified since read from backing store, and a physical memory page address 1332.

When a valid entry in the TLB, with present bit=1, can be found that contains the region identifier contained within the region register specified by the region register selector field of the virtual memory address, and that entry contains the virtual-page address specified within the virtual memory address, then the processor determines whether the virtual-memory page described by the virtual-memory address can be accessed by the currently executing process. The currently executing process may access the memory page when the access rights within the TLB entry allow the memory page to be accessed by the currently executing process and if the protection key within the TLB entry can be found within the protection key registers 1334 in association with an access mode that allows the currently executing process access to the memory page. Protection-key matching is required only when the PSR.pk field of the PSR register is set. The access rights contained within a TLB entry include a 3-bit access mode field that indicates one, or a combination of, read, write, and execute privileges, and a 2-bit privilege level field that specifies the privilege level needed by an accessing process. Each protection key register contains a protection key of up to 24 bits in length associated with an access mode field specifying allowed read, write, and execute access modes and a valid bit indicating whether or not the protection key register is currently valid. Thus, in order to access a memory page described by a TLB entry. The accessing process needs to access the page in a manner compatible with the access mode associated with a valid protection key within the protection key registers and associated with the memory page in the TLB entry, and needs to be executing at a privilege level compatible with the privilege level associated with the memory page within the TLB entry.

When an entry is not found within the TLB with a region identifier and a virtual page address equal to the virtual page address within the virtual memory address and a region identifier selected by the region register selection field of a virtual memory address, then a TLB miss occurs and hardware may attempt to locate the correct TLB entry from an architected mapping control table, called the virtual hash page table ("VHPT"), located in protected memory, using a hardware-provided VHPT walker. When the hardware is unable to locate the correct TLB entry from the VHPT, a TLB-miss fault occurs and a kernel or operating system is invoked in order to find the specified memory page within physical memory or, if necessary, load the specified memory page from an external device into physical memory, and then insert the proper translation as an entry into the VHPT and TLB. When, upon attempting to translate a virtual memory address to a physical memory address, the kernel or operating system does not find a valid protection key within the protection key registers 1334, when the attempted access by the currently executing process is not compatible with the access mode in the TLB entry or the read/write/execute bits within the protection key in the protection key register, or when the privilege level at which the currently executing process executes is less privileged than the privilege level needed by the TLB entry, then a fault occurs that is handled by a processor dispatch of execution to operating system code.

Figure 14:
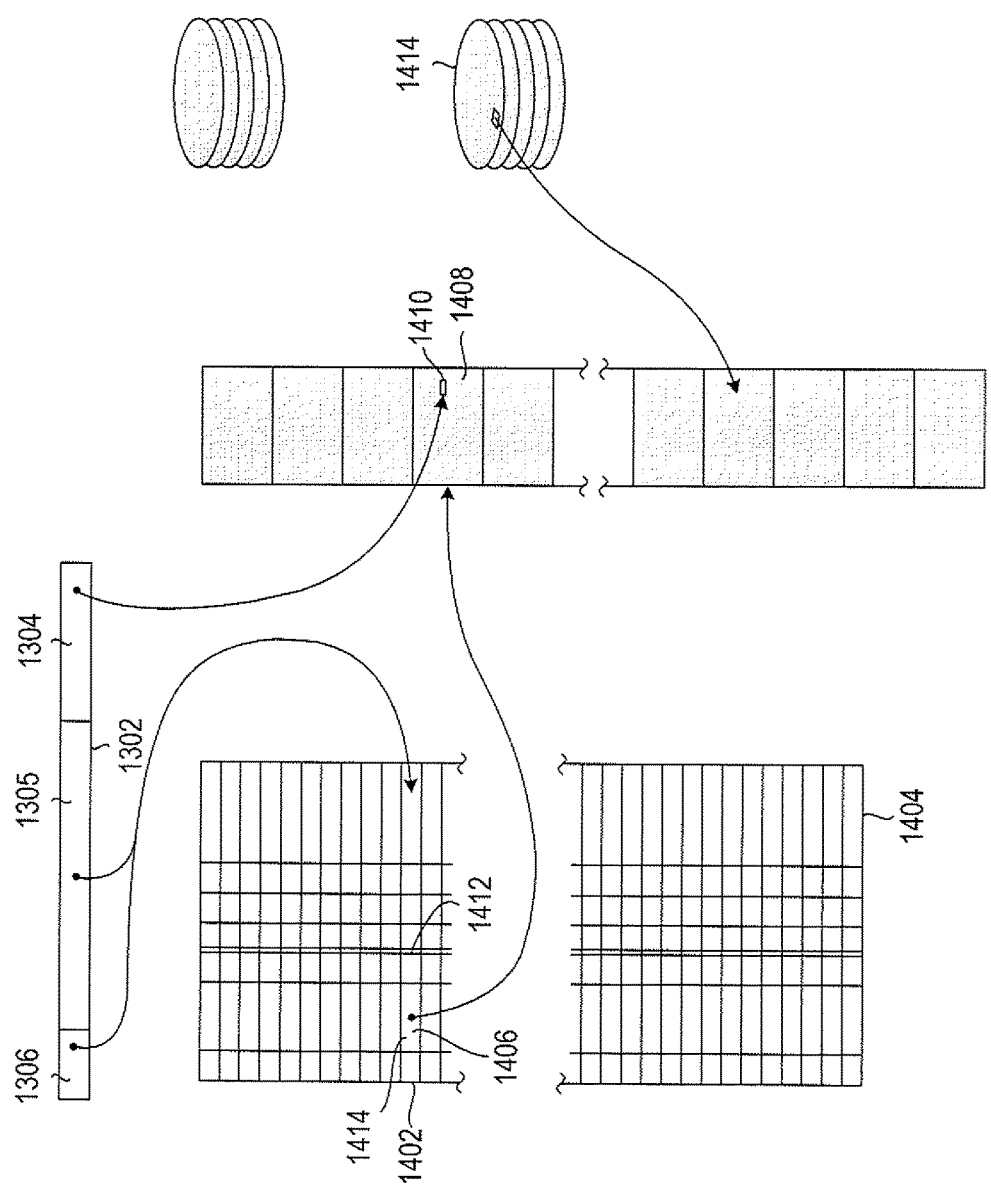
FIG. 14 shows the data structures employed by an operating system to find a memory page in physical memory corresponding to a virtual memory address.

FIG. 14 shows one form of a data structure employed by an operating system to find a memory page in physical memory corresponding to a virtual memory address. The virtual memory address 1302 is shown in FIG. 14 with the same fields and numerical labels as in FIG. 13. The operating system employs the region selector field 1306 and the virtual page address 1305 to select an entry 1402 within a virtual page table 1404. The virtual page table entry 1402 includes a physical page address 1406 that references a page 1408 in physical memory. The offset 1304 of the virtual memory address is used to select the appropriate byte location 1410 in the virtual memory page 1408. The virtual page table 1402 includes a bit field 1412 indicating whether or not the physical address is valid. If the physical address is not valid, then the operating system commonly selects a memory page within physical memory to contain the memory page, and retrieves the contents of the memory page from an external storage device, such as a disk drive 1414. The virtual page table entry 1402 contains additional fields from which the information needed for a TLB entry can be retrieved. Once the operating system successfully maps the virtual memory address into a physical memory address, that mapping is entered into the virtual page table entry and, formatted as a TLB entry, is inserted into the TLB.

RDMA

Figure 15A:
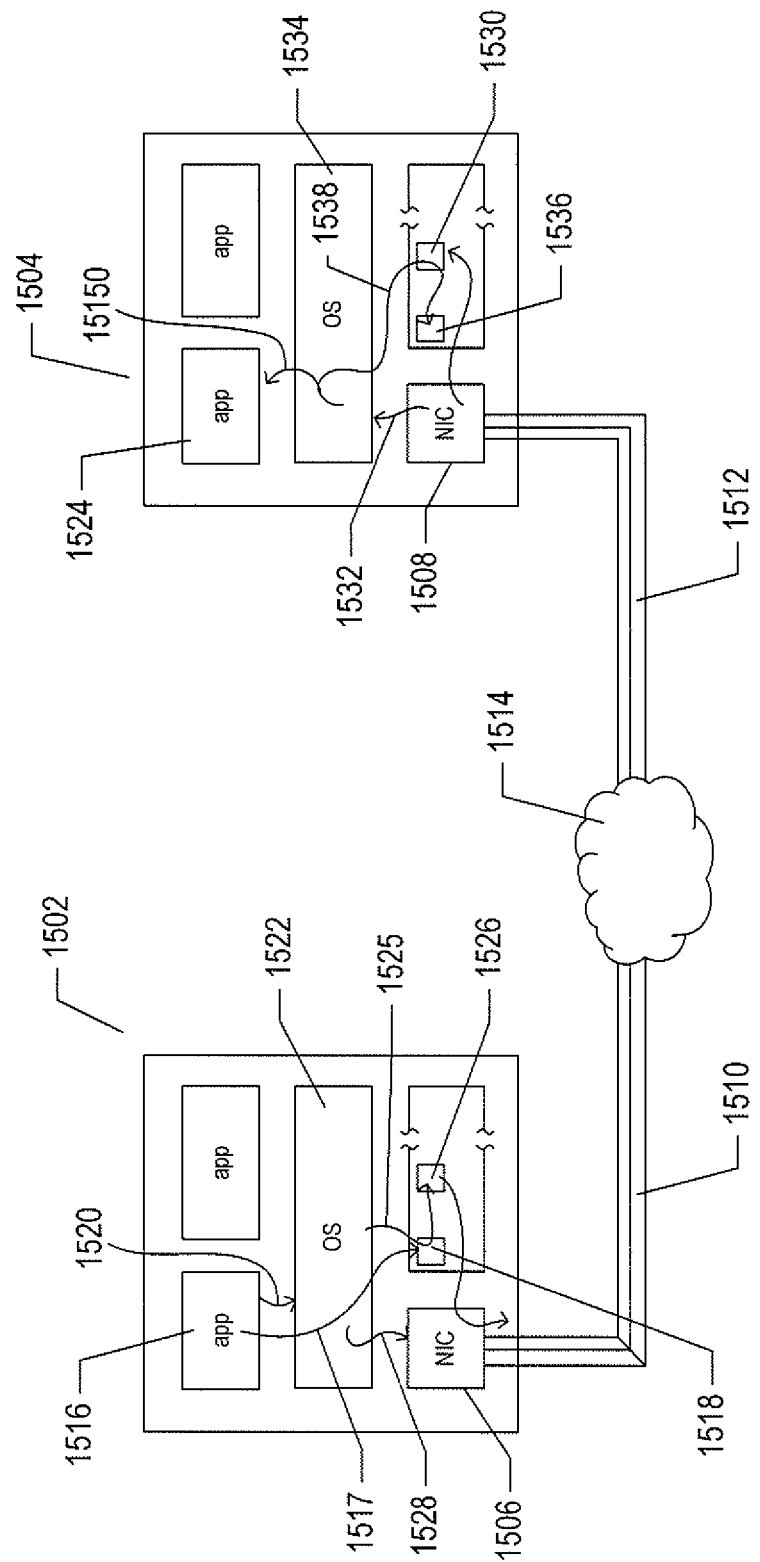
FIGS. 15A-B illustrate remote-direct memory access ("RDMA").
Figure 15B:
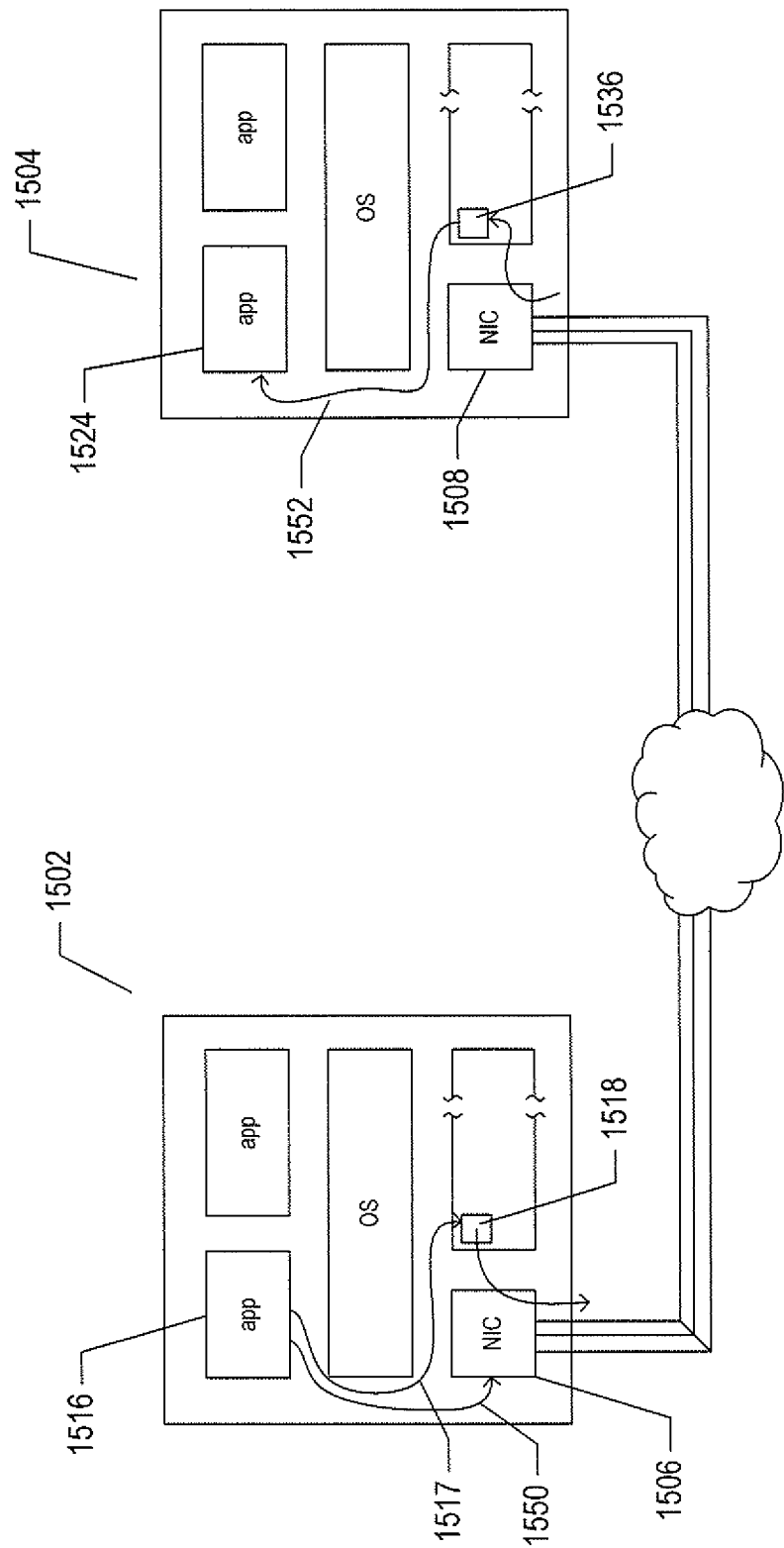

FIGS. 15A-B illustrate remote-direct memory access ("RDMA"). FIG. 15A shows a traditional, operating-system-based method by which a first application executing within a first computer system transfers data to a second application executing within a second, remote computer system. The first computer system 1502 is interconnected with the second computer system 1504 by an electronic communication subsystem and medium represented, in FIG. 15A, by a network interface card ("NIC") 1506 in the first computer, a NIC 1508 in the second computer, and the communications media represented by paths 1510 and 1512 and cloud 1514. The two paths 1510 and 1512 and cloud 1514 symbolize any of many different types of communications subsystems and media, including Infiniband®, Ethernet/TCP/IP, iWarp, Remote Direct Memory Access over the Converged Enhanced Ethernet Fabric ("RoCEE"), and other such communications subsystems.

In a first step, the first application 1516 writes data 1517 into a memory buffer 1518 allocated on behalf of the application by the operating system as a result of a previous system call made by the application program. The application then makes a system call 1520 to the operating system 1522 to initiate transfer of the data from the memory buffer 1518 on the first computer system 1502 to the second computer system 1504. In the call to the operating system, the application provides various addresses and identifiers to the operating system that identify the remote, second computer system 1504 and/or a memory buffer allocated to the second application program 1524 running on the remote, second computer. The operating system copies 1525 data from the applications memory buffer 1518 to an operating-system buffer 1526 allocated for data transfers to the NIC. The operating system then issues a command 1528 to the NIC to transfer data in the memory buffer 1526 to the remote computer system. In certain cases, the operating system may generate multiple calls to transfer packet-sized blocks of data. In other cases, the NIC 1506 is responsible for packaging the data into packets. In either case, the NIC encapsulates the data into one or more data packets together with address and identifier information and transmits the data through the communications media 1510, 1512, and 1514 to the NIC 1508 within the second, remote computer 1504. When the NIC 1508 in the second computer system 1504 receives the data packets, the NIC transfers the data to an operating-system buffer 1530 and notifies 1532 the operating system 1534 in the remote computer system, generally through an interrupt, of the arrival of the data and of the intended recipient. The operating system 1534 responds to the interrupt by using the supplied information to determine a memory buffer 1536 previously allocated to the remote application 1524 to which the data is directed and copies 1538 data from the operating system memory buffer 1530 to the application memory buffer 1536. The operating system then notifies 1540 the second application 1524 running on the remote computer system 1504 that data has been sent to it.

The above description is a simplification of the many steps and activities that transpire during transfer of data from a first application program 1516 to the second application program 1524. However, even this simplified illustration reveals that the data transfer involves multiple context switches between the application programs and operating systems, memory copies from application buffers to operating-system buffers and from operating-system buffers to application buffers, and multiple system calls and asynchronous notifications. All of these activities add significant latency and computational overhead to the time needed for transfer of the data from the first NIC 1506 to the second NIC 1508.

FIG. 15B illustrates an example RDMA-facilitated data transfer, in order to contrast the RDMA-facilitated data transfer with the data transfer discussed above with reference to FIG. 15A. In order to carry out RDMA-facilitated data transfer, the first application program 1516 writes data to be transferred 1517 to the application memory buffer 1518. However, rather than making system calls, the application directly interacts, through an RDMA interface that runs in the context of the application program, with the NIC 1550 in order to instruct the NIC to read data directly from the application buffer 1518 and transfer the data to the NIC 1508 in the remote computer system 1504. The NIC in the remote computer system then writes the received data to the appropriate application buffer 1536. The second application 1524 can then access 1552 the data in the applications memory buffer 1536.

RDMA-facilitated data transfer involves various additional interfaces and connection-setup overheads. However, as can be seen by comparing FIG. 15B to FIG. 15A, RDMA-facilitated data transfer does not involve copying of data between operating-system buffers and application buffers and does not involve context switches between application programs and operating systems as a result of system calls and asynchronous notifications. However, at least in certain types of RDMA-facilitated data transfer, the communicating application programs need to poll memory buffers in order to detect arrival of data and, in most types of RDMA-facilitated data transfer, the application memory buffers must be pinned in physical memory so that they are not inadvertently paged out by the operating-system virtual-memory subsystem. Both polling and page pinning may introduce their own latencies and inefficiencies. However, various types RDMA-facilitated data transfer employ a variety of techniques to ameliorate these potential latencies and inefficiencies.

RDMA-facilitated data transfer, discussed above with reference to FIG. 15B, is particularly popular in high-performance-computing ("HPC") contexts, including highly parallel distributed computing systems in which distributed shared memory and inter-process messaging are implemented based on RDMA data transfers. RDMA is also popular in various high-end financial computing systems that monitor and respond to real-time financial-transaction data. While RDMA is discussed, above, in terms of application-program-initiated data transfers, RDMA may also be used by virtualization layers to transfer the contents of memory between host systems, by doing so offloading memory-copy-related CPU activity from host processors to the processor or processors within NIC devices.

RDMA-Based VMotion

Figure 16:
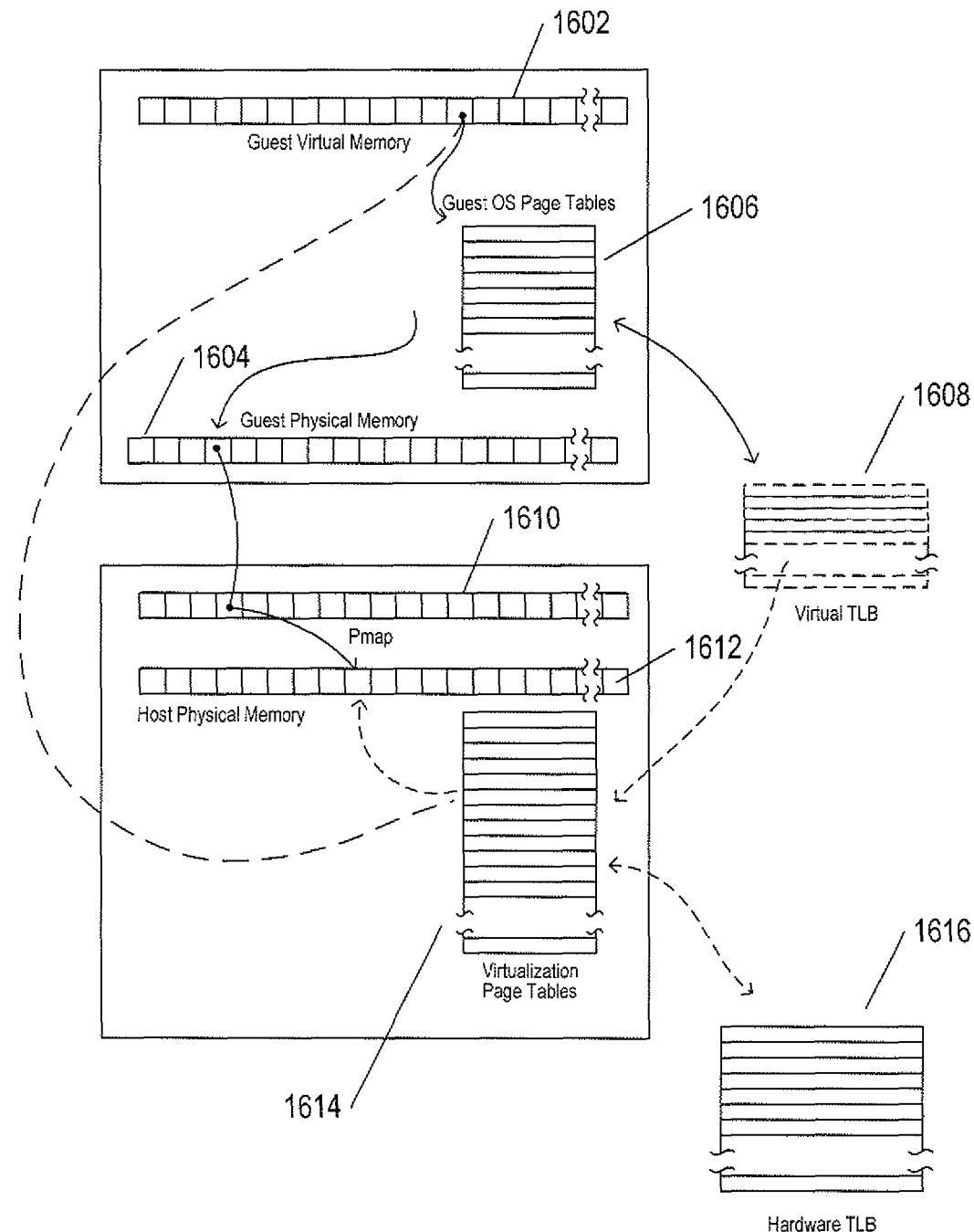
FIG. 16 illustrates virtual memory provided to a virtual machine by the virtualization layer of a virtualized host computer.

FIG. 16 illustrates virtual memory provided to a virtual machine by the virtualization layer of a virtualized host computer. The guest operating system running within the virtual machine maps guest-OS or VM virtual memory 1602 to guest physical memory 1604 via guest-OS page tables 1606. The guest operating system is, in general, unaware that it is executing above a virtualization layer, rather than directly above a hardware layer. The guest OS uses guest-OS page table entries to load a virtual translation lookaside buffer ("virtual TLB") 1608 provided to the guest OS via the virtualization layer and virtualized system calls. The VM kernel within the virtualization layer maintains, for each VM, a Pmap data structure/map 1610 that maps guest physical memory pages to host physical memory 1612. The VM kernel also maintains virtualization page tables 1614 for each VM/guest OS, also referred to as "shadow page tables." It is these shadow page tables that are used by the VM kernel for loading entries into the hardware TLB 1616. The shadow page tables 1614 contain entries that map guest-OS virtual memory pages to host physical memory. By using shadow page tables, the VM kernel can take advantage of fast hardware support for page-table walking and page swapping rather than needing to emulate hardware virtual memory support on behalf of guest operating systems.

In addition to allowing the VM kernel to avoid emulating processor hardware support for virtual memory, the mapping between guest physical memory and host physical memory maintained by the VM kernel provides for a variety of additional virtualization features. One feature is referred to as transparent page sharing ("TPS"). FIGS. 17A-B illustrate transparent page sharing. In FIG. 17A, a virtualized host supports two VMs, VM1 and VM2, with the guest physical memory for VM1 1702, the guest physical memory for VM2 1704, and the host physical memory 1706 represented by arrays of memory pages. As discussed above, guest physical memory is virtualized by the VM kernel using the Pmap (1610 in FIG. 16). It turns out that, in many cases, two different concurrently executing VMs may access pages that contain identical stored memory values. For example, two different virtual machines may run the same application, in which case the two virtual machines may share many identical application-program memory pages. Other examples include virtual machines that run the same or different applications which access common data. When two or more VMs access memory pages with identical contents, the VM kernel can economize host-physical-memory allocation, as next described.

In FIG. 17A, the guest physical memory page at page address a 1708 and the guest physical memory page at page address b 1710 in VM1 guest physical memory and VM2 guest physical memory, respectively, both have identical contents. As a result, the VM kernel maps both of these pages to a single host physical memory page 1712 at host-physical-memory-page address c. The VM kernel continuously monitors the contents of physical memory and the guest-to-host mappings in order to detect opportunities for shared pages, such as shared host-physical-memory page 1712 shown in FIG. 17A. The VM kernel does this by computing hashes for pages and comparing page hashes in order to identify candidate shared pages before undertaking a more expensive word-by-word comparison of the contents of potential shared pages to determine whether or not their contents are identical. The virtualization layer maintains lists of shared pages, each shared page represented by a data structure that includes a reference count that indicates the number of VMs currently mapping the shared page to guest memory. The VM kernel also traps or faults writes to shared pages in order to undertake a copy-on-write ("COW") operation for divergent shared memory pages. FIG. 17B illustrates the copy-on-write operation. FIG. 17B shows the same guest and host physical memories shown in FIG. 17A. However, in between the memory state shown in FIG. 17A and the memory state shown in FIG. 17B, VM1 has written a value to the memory page at page address a in VM1's guest physical memory, as indicated by the $w_1$ and curved arrow 1714 in FIG. 17B. As a result of this attempted write, the VM kernel carries out a COW operation in which shared page 1712, at address c in host physical memory is copied to a newly allocated host-physical-memory page at page address d 1716 and the Pmap for VM1 is altered so that VM1 guest-physical-memory page address a is now mapped to host-physical-memory page address d.

Figure 18A:
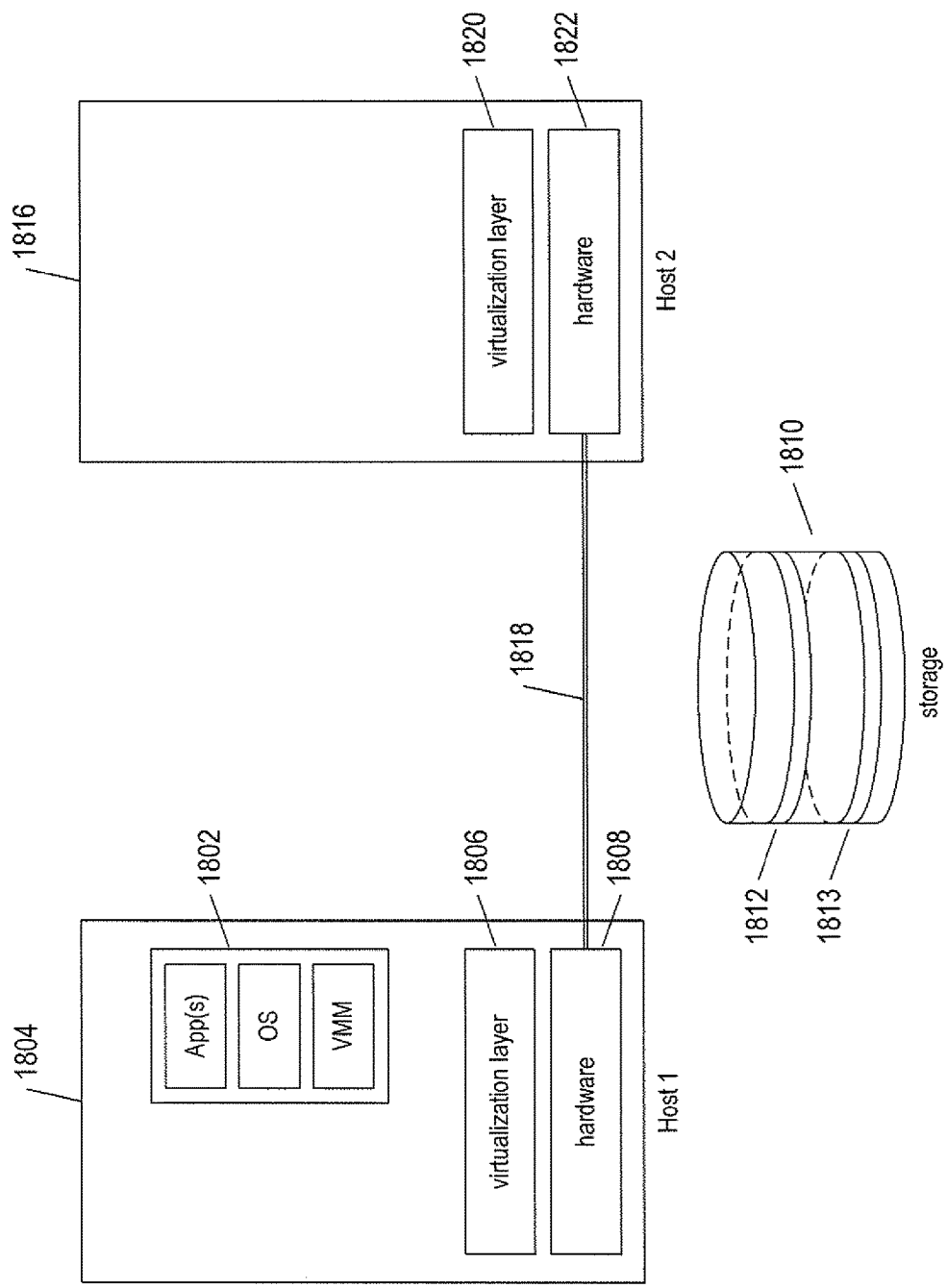

Executing virtual machines may be moved from one host computer to another in an operation referred to as "VMotion," another term for "live migration of a VM." The relocation of an executing VM is carried out by the virtualization layers of the host computers and a VI management server in such a way that there is almost no down time in VM execution. FIGS. 18A-F illustrate the VMotion operation. FIGS. 18A-F all use the same illustration conventions, additionally used in FIGS. 19A-D, that are next described with reference to FIG. 18A. As shown in FIG. 18A, a VM 1802 is executing in a first host computer 1804 that includes a virtualization layer 1806 and a hardware layer 1808, as discussed, in detail, in previous subsections. In addition, the host computer is connected to one or more local mass-storage devices, shown as a single storage device 1810 in FIG. 18A, that stores the swap files 1812-1813 that represent the mass-storage backing for the VMs' virtual memory. The first host computer 1804 is interconnected with a second host computer 1816 via one or more physical and virtual networks, represented by network path 1818 in FIG. 18A. Like the first host computer, the second host computer contains a virtualization layer 1820 and a hardware layer 1822, and shares mass storage device 1810. The VMotion operation is initiated, as shown in FIGS. 18B-F, discussed below, to move VM 1802 from the first host computer 1804 to the second host computer 1816.

There are many different steps in the VMotion operation, which may involve various concurrently executing processes and various types of ordering and synchronization techniques to ensure that the movement of various components of the VM occur prior to particular suboperations. The VMotion operation involves cooperative interaction between a management server and two host systems, each running a management-server agent. FIGS. 18B-F are meant to illustrate the general approach to implementing the VMotion operation, but are not intended to provide fine-grained details or to indicate the particular ordering of steps and sub-operations.

Figure 18B:
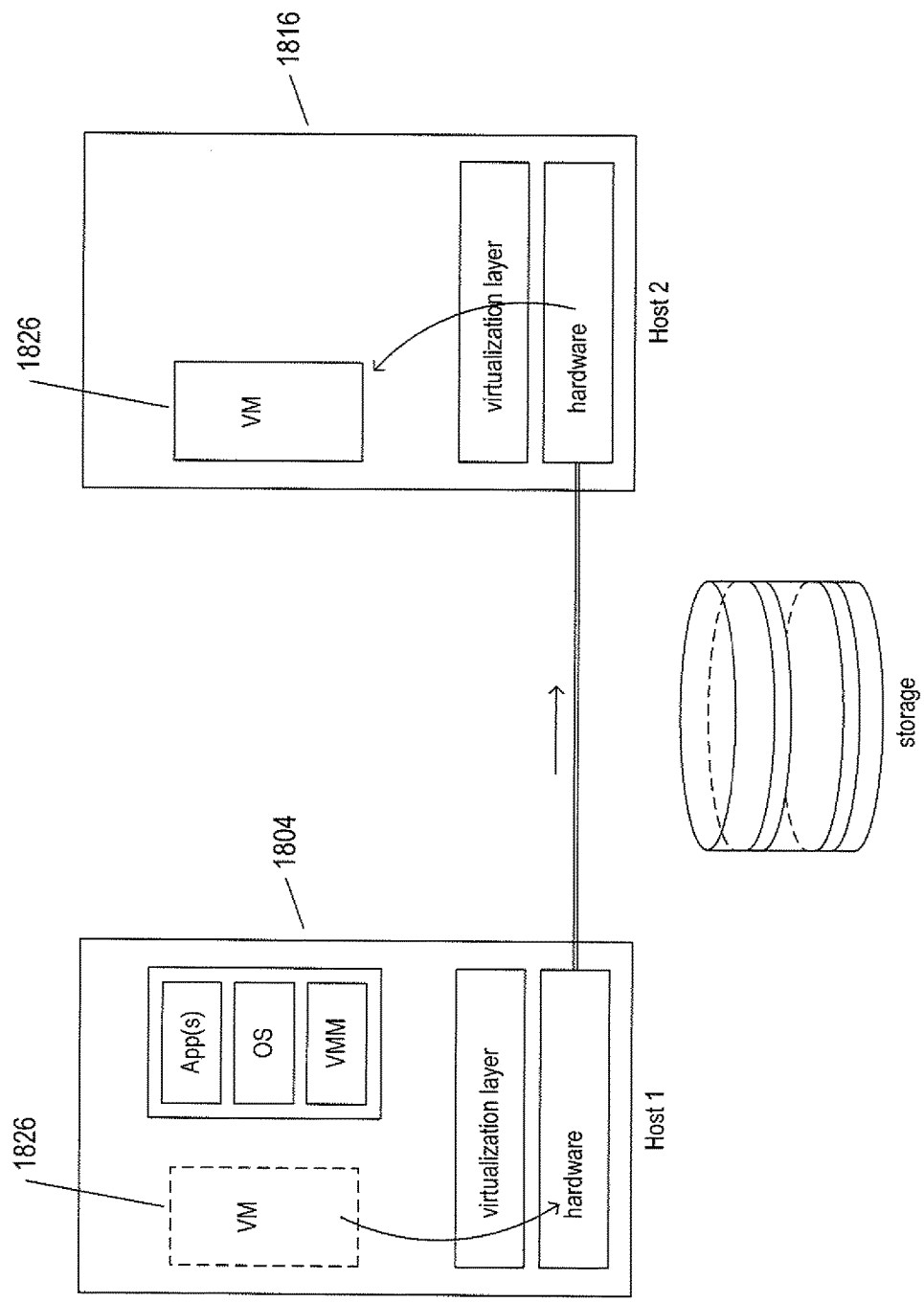

As shown in FIG. 18B, the stored data and instructions associated with the VM are aggregated into a VM 1826 that is transferred from the first host 1804 to the second host 1816. Execution of the VM is subsequently resumed, on the second host, following restoration of all VM data and instructions on the second host.

Figure 18D:
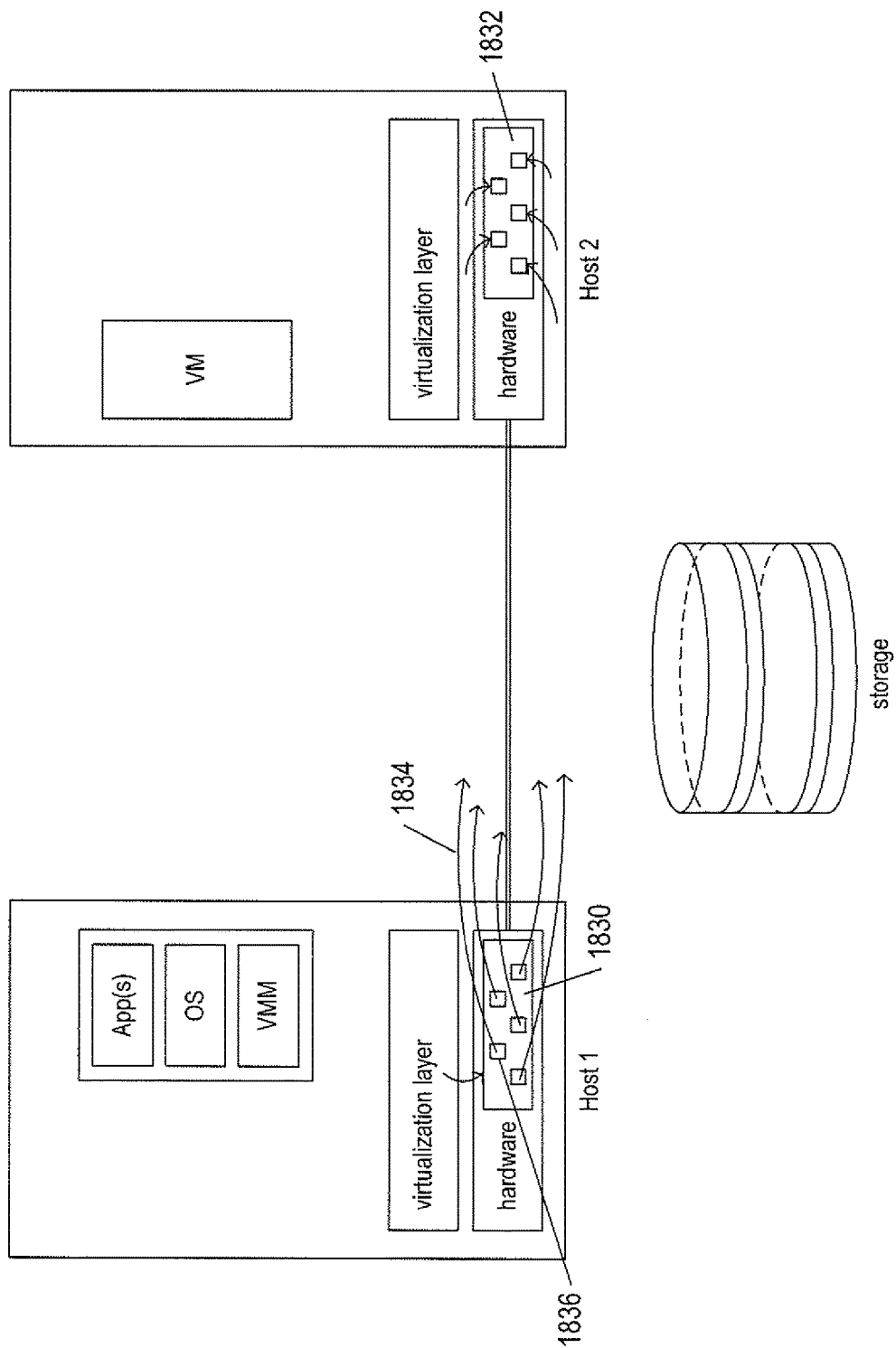

As shown in FIG. 18C, the memory contents for the guest-OS physical pages currently mapped to, and residing in, host physical memory on the first host computer, represented in FIG. 18C by rectangle 1830, are transferred to the memory 1832 within the second host computer. This transfer may involved transferring lists of guest physical pages and copying the contents of dirty pages to physical memory of the second host computer. During this process, the VM kernel monitors, using write protection or other techniques, modifications to memory pages by the VM, which continues to execute as the swap files and memory are being transferred from the first host computer to the second host computer. As shown in FIG. 18D, execution of the VM is halted, on the first host computer, and any memory pages modified during the VMotion process are then transferred from memory on the first host computer to memory on the second host computer, as represented by curved arrows, such as curved arrow 1834, and small rectangles, such as small rectangle 1836, representing modified pages. Finally, as shown in FIG. 18E, execution of the VM is renewed on the second host computer 1838 and all of the resources allocated for the VM on the first host computer are deallocated.

Figure 19A:
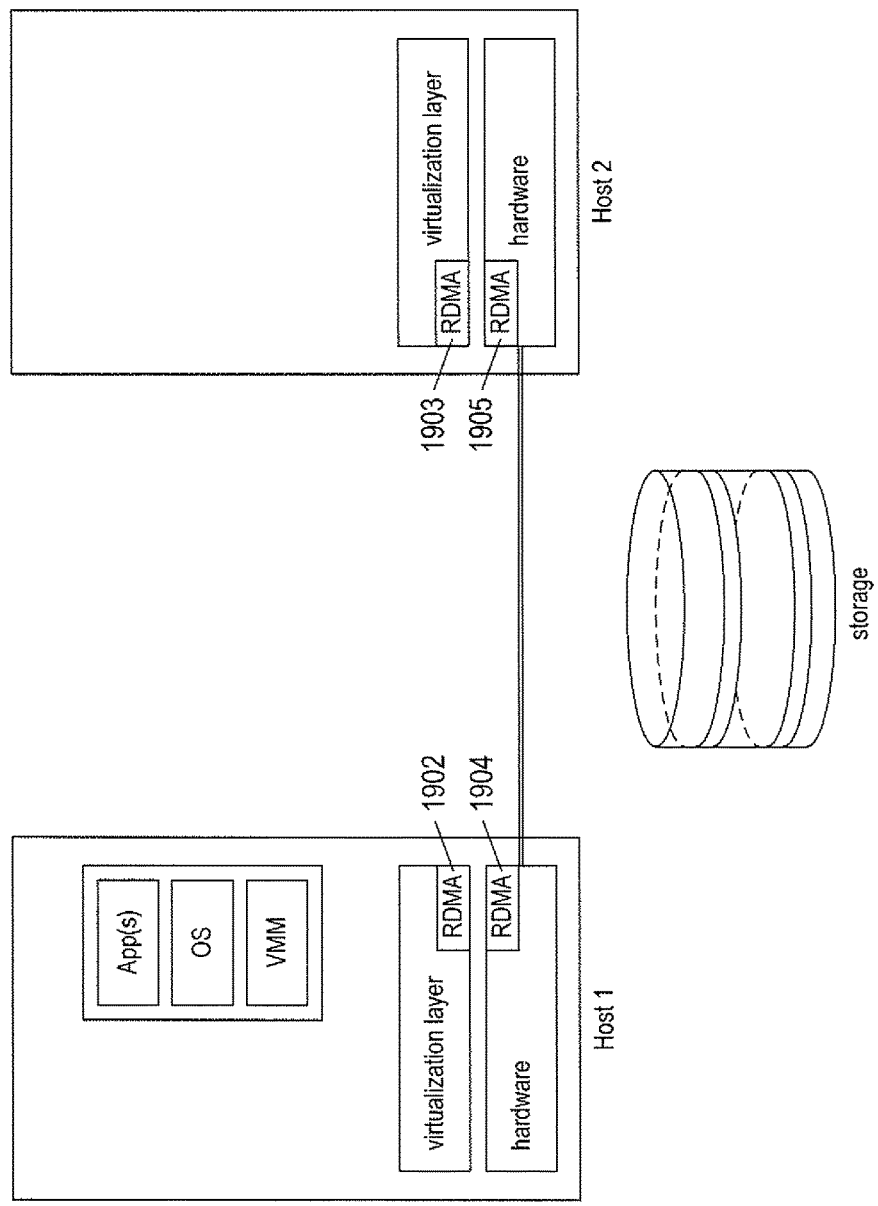
FIGS. 19A-D illustrate the RDMA-based approach to VMotion.
Figure 19B:
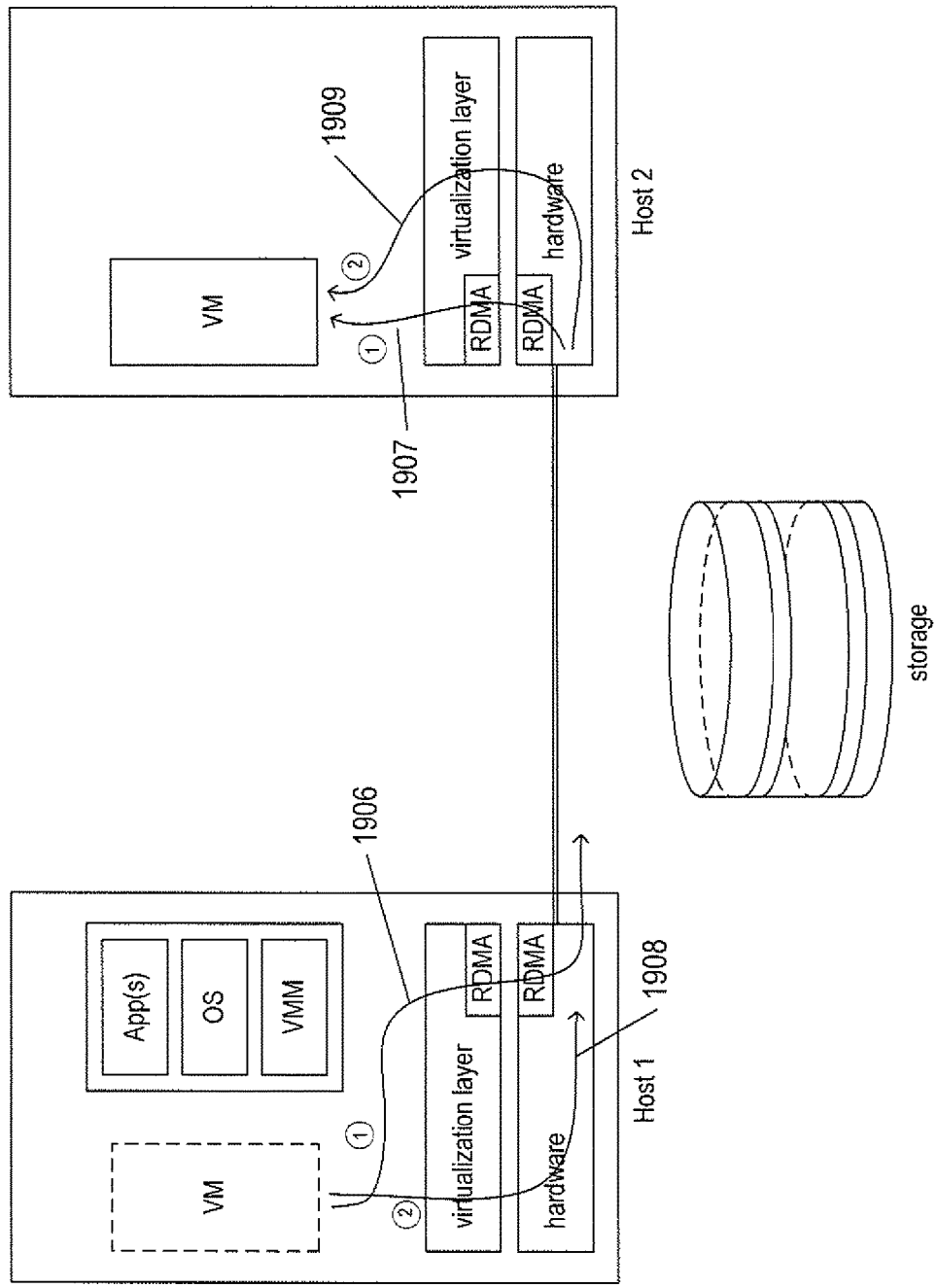

The current document is directed to a new approach to the VMotion operation that takes advantage of RDMA data transfer facilities within host computers. FIGS. 19A-E illustrate the RDMA-based approach to VMotion. FIG. 19A is similar to FIG. 18A, with the exception that the RDMA interface and data-transfer machinery within each host computer are represented by a small RDMA block 1902-1903 in the virtualization layers of the two host computers and a small RDMA block 1904-1905 in the two hardware layers of the host computers. FIG. 19B is similar to FIG. 18B, with the exception that, when possible, transfer of the VM from the first host computer to the second computer may be undertaken via RDMA-based file transfer, as indicated by curved arrows 1906-1907 that represent an RDMA-based file-transfer path. When RDMA file transfer is not available, then a traditional file transfer between the first and second hosts is carried out, as represented by curved arrows 1908-1909.

Figure 18E:
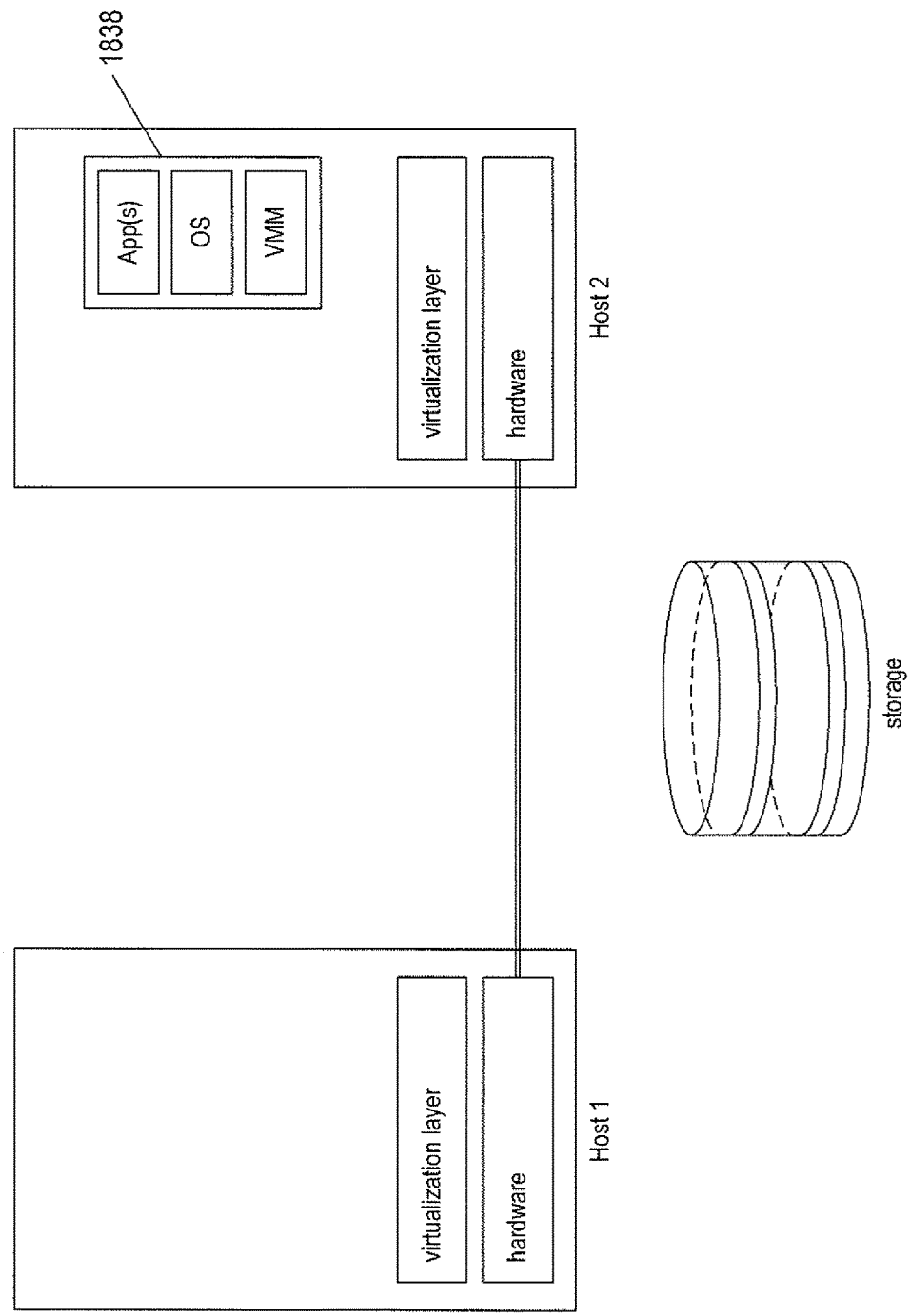
Figure 19C:
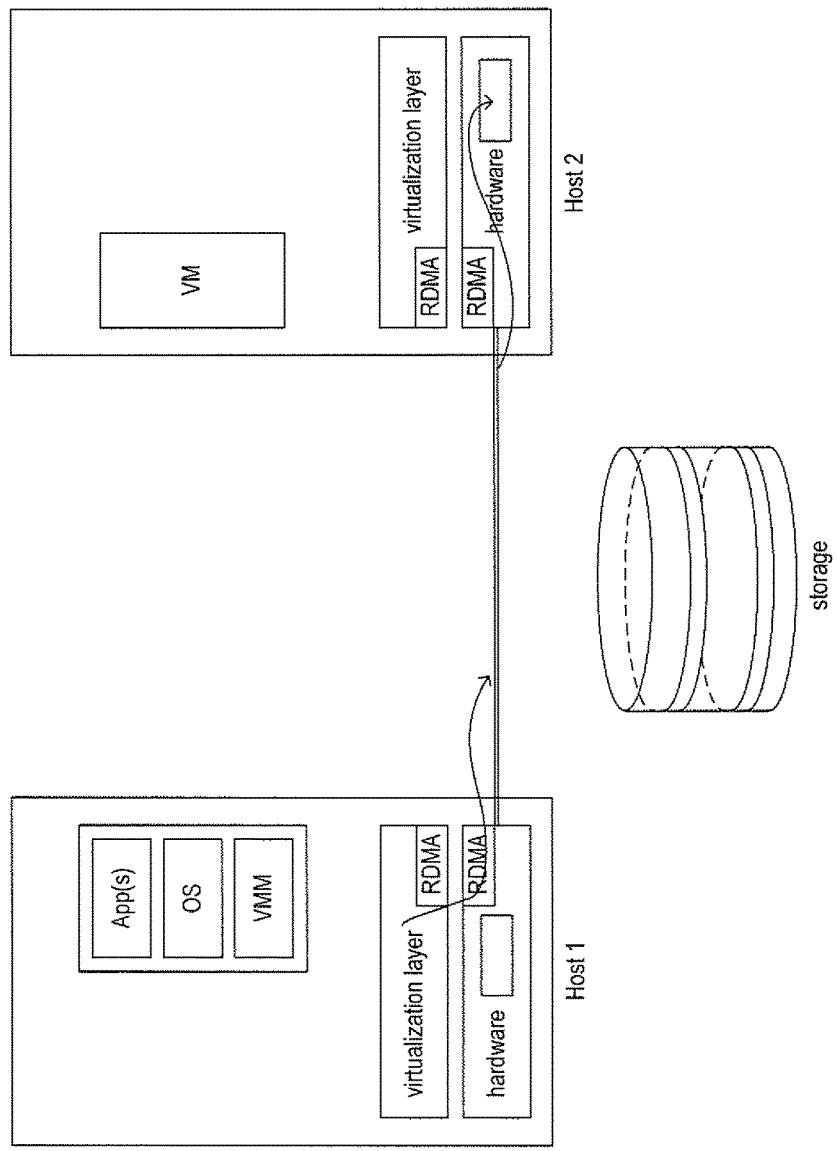

FIG. 19C represents the memory-transfer step illustrated, for the traditional VMotion operation, in FIGS. 18C-E. In the RDMA-based VMotion operation, guest memory pages mapped to host physical memory that have been modified, and therefore have set dirty bits, are transferred from the first host computer to the second host computer via RDMA memory-transfer operations. As discussed above. RDMA memory transfer operations are generally more efficient than traditional network-based data transfer, which involves expenditure of a significant number of host-system processor cycles. In addition, as further discussed below, rather than transferring all of the modified guest memory pages mapped to host physical memory, only the non-shared modified pages are transferred. Shared memory pages remain on the first host computer and are subsequently accessed, when mapped to host physical memory of the second host computer, via RDMA memory transfer. As a result, the RDMA-based VMotion operation needs to initially allocate fewer physical host memory pages to the transferred VM. Thus, shared pages can be used to increase the efficiency of the VMotion operation just as they are traditionally used to increase the efficiency of host-system operation.

Figure 19D:
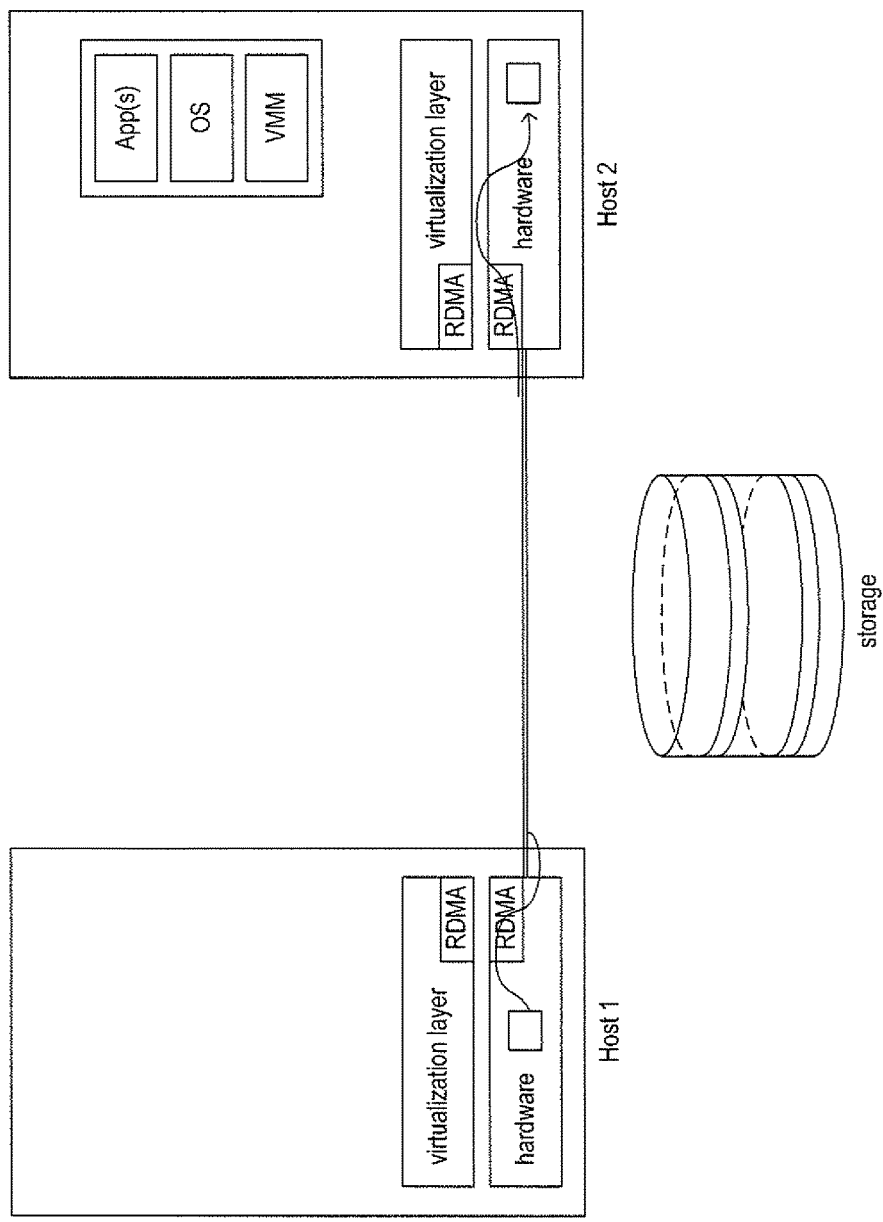

Finally, as shown in FIG. 19D, execution of the original VM is terminated, any memory pages that have been written during the VMotion operation that were not transferred to the new host system are transferred, and execution of the relocated VM is launched. Resources allocated to the original VM in the first host system are additionally reclaimed.

FIGS. 20A-F illustrate handling of shared pages by RDMA-based VMotion. FIGS. 20A-F use the same illustration conventions as used in FIGS. 17A-B. Initially, as shown in FIG. 20A, two VMs, VM1 and VM2, execute on a first host computer and a single VM, VM3, executes on a second host computer. The guest physical memory for the first, second, and third VMs is represented by page arrays 2002-2004, respectively, and the host physical memories for the first and second hosts are represented by page arrays 2006 and 2008. As in FIGS. 17A-B, the Pmap mapping between guest physical memory and host physical memory is represented by arrows, such as arrow 2010. There are two shared pages 2012-2013 in the physical memory of the first host that are shared by VM1 and VM2.

As shown in FIG. 20B, during a VMotion operation in which VM1 is moved from the first host computer to the second host computer, a guest physical memory for the transferred VM1 2014 is established within the second host computer and dirty or modified non-shared pages are transferred by the RDMA data-transfer facility from the first host to the second host, as indicated by arrows 2016-2019 in FIG. 20B.

As shown in FIG. 20C, after the transferred VM is restarted on the second host and VM1 has been completely removed from the first host, shared pages 2012 and 2013 remain shared, with the VM kernel on the second host mapping the shared pages from VM1 guest physical memory 2014 via RDMA data transfer back to the shared pages on the first host computer, as indicated by arrows 2020 and 2021 in FIG. 20C.

As shown in FIG. 20D, the VM kernel on the second host computer may, during monitoring for potential shared ages, identify a page shared between VM3 and VM1 2024 and remap the mapping between VM1 guest physical memory to the shared page, as represented by arrow 2026 in FIG. 20D. Alternatively, the mapping for VM3 may be altered. However, in either case, local page sharing continues to be carried out on the second host computer.

As shown in FIG. 20E, when VM2, which continues to execute on the first host computer, attempts to write to shared page 2012, then a COW operation is carried out in which shared page 2012 is copied to a new page in host physical memory 2028 and the mapping from guest physical memory to host physical memory for VM2 has changed, as indicated by arrow 2030. However, the shared page continues to be mapped for VM1 back to the shared page 2012 in the first host computer, as indicated by arrow 2021.

As shown in FIG. 20F, when VM1 attempts to access the second shared page 2013 via a write operation, a RDMA transfer is used to copy the second shared page 2013 to a location in the host physical memory of the second host computer 2034 and the pages remapped from VM1 guest physical memory to host physical memory, as indicated by arrow 2036 in FIG. 20F. Thus, sharing over RDMA from the second host computer to the first host computer is discontinued by a remote COW-like operation. In certain implementations, any access by VM1 to a remote shared page may result in a remote COW-like operation, while, in other implementations, the remote COW-like operation is carried out for any write access by VM1 to the shared page, resulting in copying over RDMA of the contents of the page to the physical memory of the second host computer. In yet other implementations, the remotely shared pages are copied to the new host, over time. The remote COW-like operation may be carried out using normal network operations or RDMA data transfer and may involve, in addition to the first and second host systems, the management server.

Figure 21:
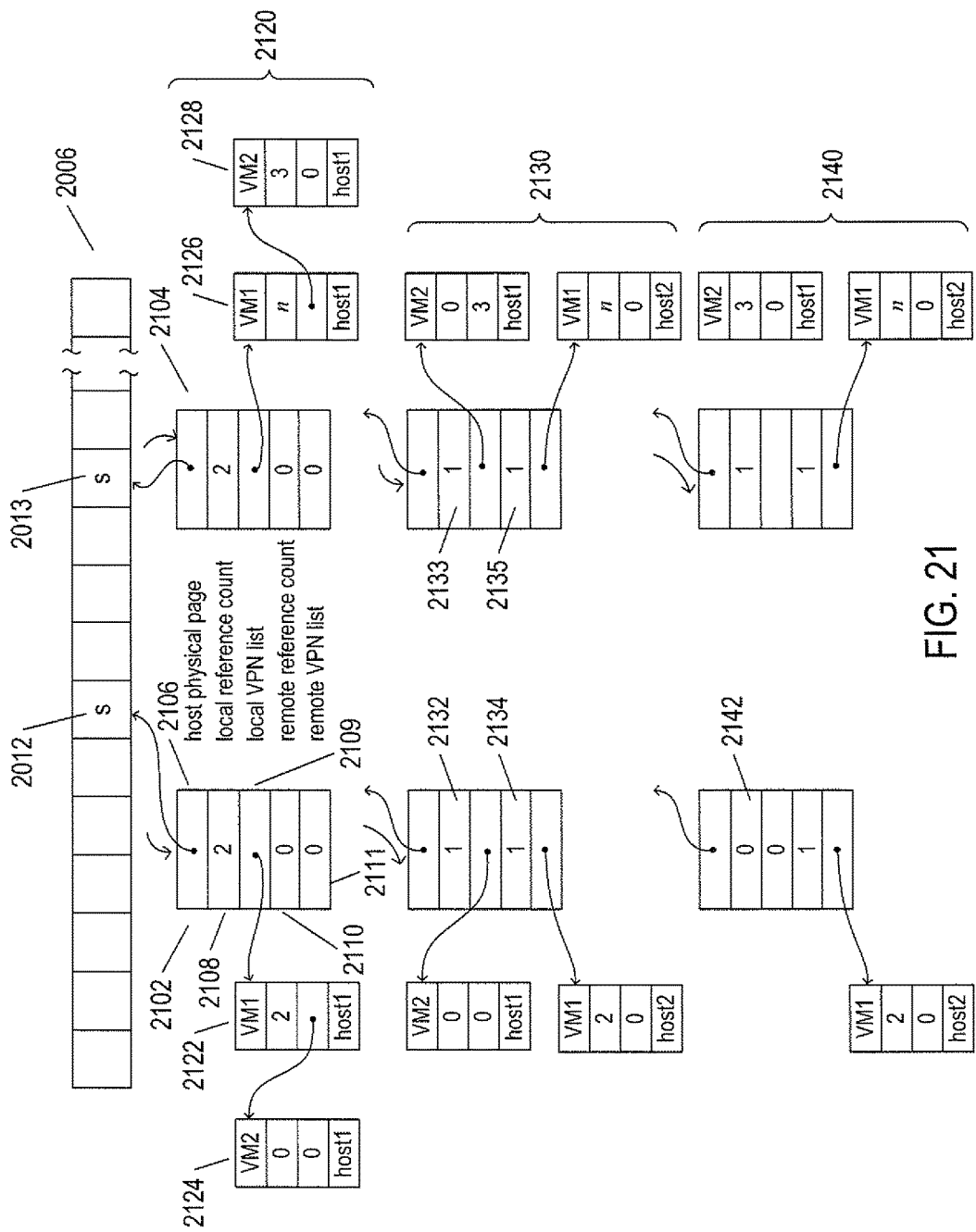
FIG. 21 illustrates a shared-page data structure used to keep track of both local and remote sharing of pages.

FIG. 21 illustrates a shared-page data structure used to keep track of both local and remote sharing of pages. At the top of FIG. 21, the host physical memory for the first host computer, shown in FIG. 20A, is provided 2102. Each of the two shared pages 2012 and 2013 are represented by a shared-page structure 2102 and 2104, respectively. The shared-page data structures include a link or reference to the host physical page 2106, a local reference count 2108, a link or reference to a link list of local VPN data structures 2109, a remote reference count 2110, and a link or reference to a list of remote VPN data structures 2111. Initially, as shown in the version of the data structures at level 2120 in FIG. 21, each of the shared pages is shared only among the two local VMs, VM1 and VM2. Therefore, the local reference count for both shared pages is 2. The local VPN list for shared page 2012 includes an entry for VM1 2122 and an entry for VM2 2124. Entry 2122 indicates that the shared page has page address "2" in VM1 guest physical memory and entry 2124 indicates that shared page 2012 has guest physical memory page address "0." Similarly, entries 2126 and 2128 in the VPN list referenced from the shared-page data structure 2104 for shared page 2013 indicates that shared page 2013 has guest physical page address n for VM1 and guest physical page address "3" for VM2. When VM1 has been successfully relocated, by the VMotion operation, to the second host computer, the shared-page data structures are modified, as shown in layer 2130 of FIG. 21. At this point, only VM2 accesses the shared page from the first host computer, and so the local reference count 2132-2133 for both data structures is now 1. VM now accesses the shared pages through the RDMA facility, and therefore the remote reference count has been incremented to 1 2134-2135 in both shared-memory data structures. The local and remote VPN lists have been accordingly modified to each contain a single element, for both shared-memory data structures. As shown in level 2140 in FIG. 21, following the remote COW operation, discussed above with reference to FIG. 20E, the shared-data-page data structure for shared page 212 is modified to decrease the local reference count 2142 to 0. Following the remote COW-like operation discussed above with reference to FIG. 20F, in certain implementations, page 2013 may no longer be considered to be shared, since the local reference count would drop to 1 and the remote reference count would drop to 0. In this case, the shared-page data structure may, in certain implementations, be removed for shared page 2013 following the remote-COW-like operation discussed above with reference to FIG. 20F.

Figure 22A:
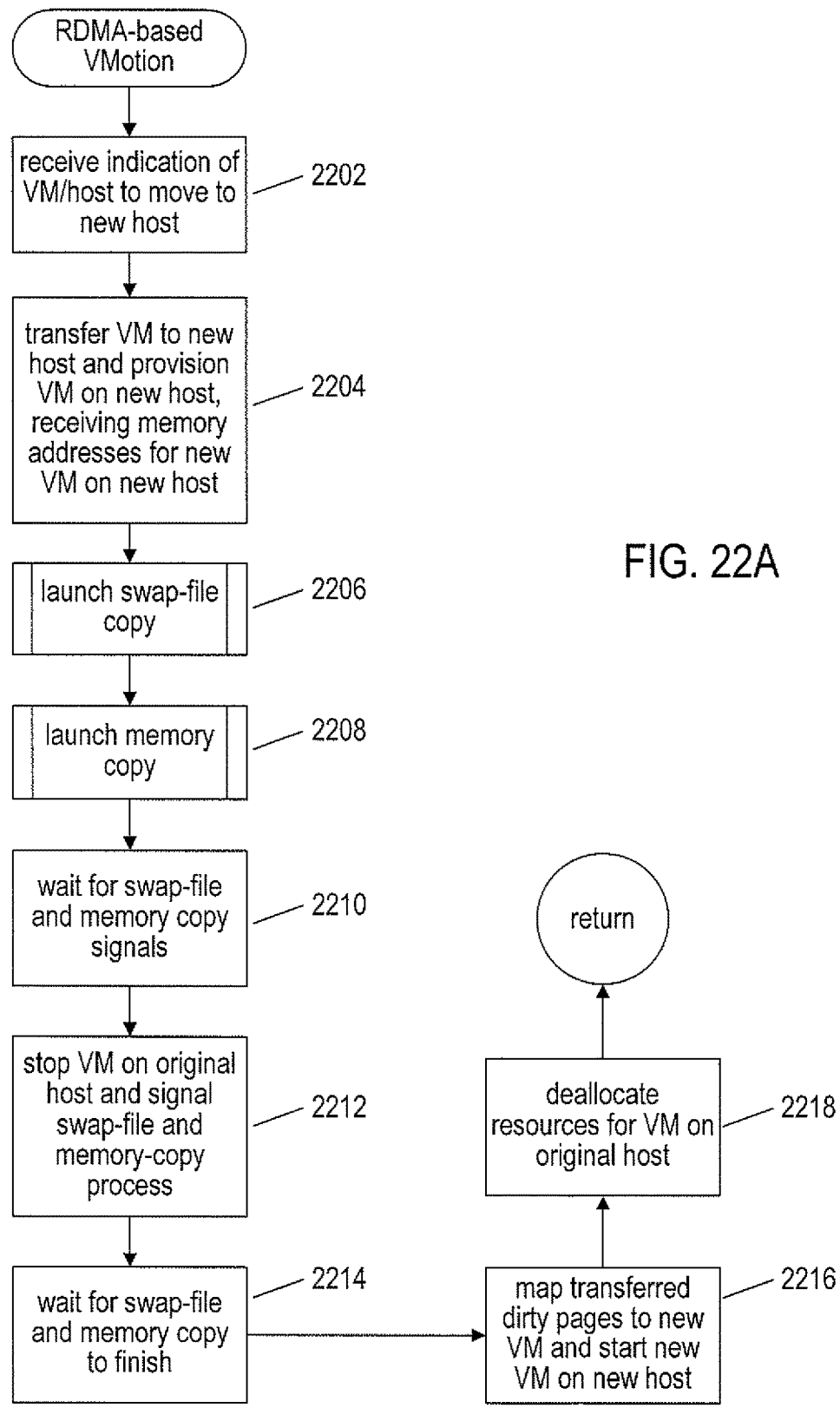
FIGS. 22A-B illustrate, using control-flow diagrams, the RDMA-based VMotion operation to which the current document is directed.
Figure 22B:
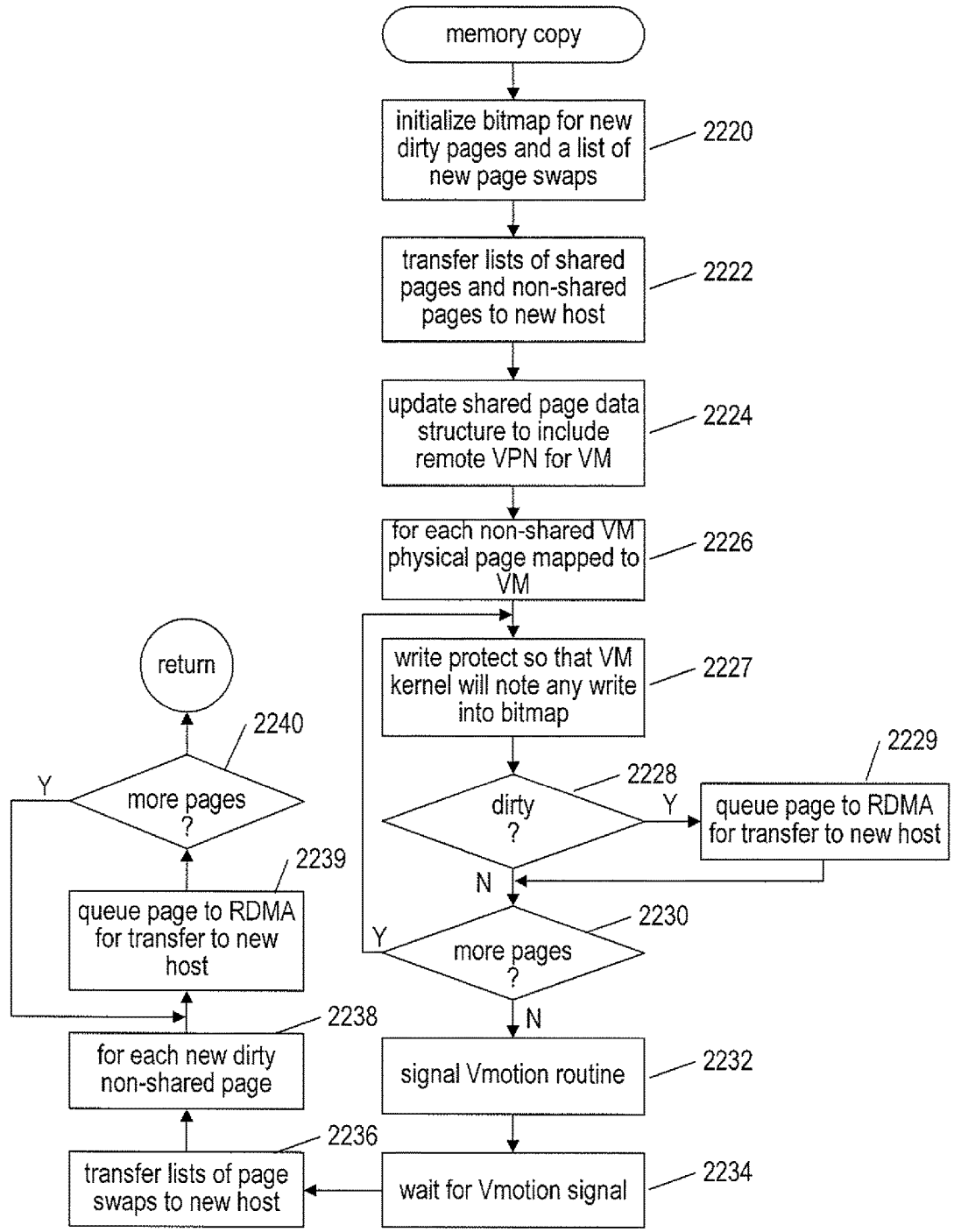

FIGS. 22A-B illustrate, using control-flow diagrams, the RDMA-based VMotion operation to which the current document is directed. FIG. 22A provides a control-flow diagram for RDMA-based VMotion. In step 2202, the RDMA-based VMotion operation receives an indication of the VM/host that is to be moved to a new host, the indication for which is also provided. Note that, as mentioned above, RDMA-based VMotion is a cooperative process that involves a management server, a first host currently running the VM, and a second host to which the VM is moved. In step 2204, the VM is transferred to the new host and a new VM is provisioned on the new host, with the provisioning process producing host physical memory addresses for the new VM that can be used for RDMA transfer operations during the VMotion operation. In step 2206, the swap-file copy operation is launched to copy swap files from the first host to the second host, when swapped-file copying is needed. In step 2208, a memory copy, discussed above with reference to FIG. 19C, is launched to copy modified non-shared memory pages from the first host to the second host. In step 2210, the RDMA-based VMotion operation waits for signals from the swap-file copy and the memory-copy operations to indicate that they have completed initial copies of the swap files in memory. In step 2212, the VM execution on the original host is stopped and the swap-file and memory-copy processes are signaled. In step 2214, the RDMA-based VMotion operation waits for signals from the swap-file and memory-copy operations indicating that they have finished. In step 2216, the modified pages transferred from the first host to the second host are mapped to the guest OS physical memory for the new VM and the new VM is started on the new host. In step 2218, resources for the VM that was moved are deallocated from the original host. Note that, after execution is resumed on the new host computer, the resumed VM begins to fault in memory pages as memory pages are accessed.

FIG. 22B provides a control-flow diagram for the memory-copy process launched in step 2208 of FIG. 22A. In step 2220, the memory-copy process initializes a bitmap to keep track of non-shared pages that are modified during the RDMA-based VMotion operation and initializes a list of new page swaps that occur during RDMA-based VMotion operation. In step 2222, the memory-copy operation transfers lists of the shared pages and non-shared pages of guest physical memory to the new host. In step 2224, the shared-page data structures on the original host are updated to include remote VPN entries for the VM that is to be moved, as discussed above with reference to FIG. 21. In the for-loop of steps 2226-2230, each non-shared guest physical memory page mapped to host physical memory on the original host computer is considered. In step 2227, the page is write protected or otherwise marked so that the VM kernel can note any subsequent modifications to the page in the bitmap initialized in step 2220. When the page is dirty, as determined in step 2228, the contents of the page are queued to the RDMA facility for transfer to the new host, in step 2229. In step 2232, the memory-copy process signals the VMotion routine. In step 2234, the memory-copy process waits for a signal from the VMotion routine. In step 2236, the memory-copy process transfers lists of page swaps that occur during the RDMA-based VMotion operation to the new host, to ensure that the new host can properly set up guest page tables. In the for-loop of steps 2238-2240, any page that was modified during the RDMA-based VMotion operation is queued to the RDMA-transfer facility for transfer to the new host. The memory-copy process terminates by signaling the RDMA-based VMotion routine.

It should be noted that, for both memory-page transfers and remote access to shared memory pages by a relocated VM, the RDMA transfer may be initiated through the RDMA interface of either or both of the host systems between which a VM is moved. For example, transfer of dirty memory pages are likely to be initiated through the RDMA interface to the network controller of the source host system and access of a shared memory page is likely to be initiated through the RDMA interface to the network controller of the host system on which a relocated VM executes. However, because both host systems have management-server agents, the management-server can direct data-transfer commands to either agent.

Although the present invention has been described in terms of particular embodiments, it is not intended that the invention be limited to these embodiments. Modifications within the spirit of the invention will be apparent to those skilled in the art. For example, any of various different implementations of RDMA-based VMotion can be obtained by varying any of many different design and implementation parameters, including programming language, control structures, data structures, hardware platforms, virtualization layers, and other such design and implementation parameters. In different implementations, the COW-like breaking of remote page sharing can be carried out upon any access to the page by moved VM or, alternatively, when the moved VM attempts to write to the page. Any of many different techniques for transferring modified memory pages and other information through the RDMA data-transfer facility can be used so that, on the new host computer, the transferred memory pages can be copied into host physical memory pages and the guest page tables and virtualization page tables properly constructed and initialized.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A virtualized distributed computing system comprising:
a first host system that includes one or more processors, one or more memories, and a management-server agent, the first host system executing an original virtual machine and interconnected with the management server through a network;
a second host system that includes one or more processors, one or more memories, and a management-server agent, the second host system interconnected with the first host system and the management server through the network; and
the management server, which coordinates a live-virtual-machine migration operation that moves the original virtual machine to the second host system, during which the contents of one or more memory pages are transferred from physical memory within the first host system to a physical memory within the second host system through a remote-data memory access interface to a network-interface controller on one or both of the first and second host systems;
wherein the original virtual machine is moved from the first host system to become a relocated virtual machine executing on the second host system with minimal interruption in execution, on the order of less than one to three seconds, by
moving an execution image of the virtual machine from the first host system to the second host system,
moving swap files of the virtual machine from the first host system to the second host system,
moving shared-memory-page and non-shared-memory-page lists for the virtual machine from the first host system to the second host system,
moving modified physical-memory pages to which guest physical pages of the virtual machine are mapped from the first host system to the second host system;
terminating execution of the original virtual machine on the first host system, and resuming execution of the relocated virtual machine on the second host computer.

2. The virtualized distributed computing system of claim 1 wherein moving modified physical-memory pages to which guest physical pages of the virtual machine are mapped from the first host system to the second host system further comprises moving, through the remote-data memory access interface to the network-interface controller on one or both of the first and second host systems, modified non-shared physical-memory pages to which guest physical pages of the virtual machine are mapped from the first host system to the second host system.

3. The virtualized distributed computing system of claim 2 wherein each shared memory page is described by a shared-memory-page data structure.

4. The virtualized distributed computing system of claim 3 wherein each shared-memory-page data structure includes:
a local reference count that indicates the number of virtual machines within the host computer system in which the shared-memory-page data structure is stored;
a reference to a list of virtual-page-number data structures, each virtual-page-number data structure including indications of the virtual machine and the virtual page number for the shared memory page described by the shared-memory-page data structure in the address space of the guest operating system of the virtual machine;
a remote reference count that indicates the number of virtual machines within host systems remote to the host computer system in which the shared-memory-page data structure is stored; and
a reference to a list of virtual-page-number data structures, each virtual-page-number data structure including indications of the virtual machine and the virtual page number for the shared memory page described by the shared-memory-page data structure in the address space of the guest operating system of the virtual machine.

5. The virtualized distributed computing system of claim 2 wherein shared physical-memory pages to which guest physical pages of the virtual machine are mapped remain mapped to the physical memory of the first host system during and after the original virtual machine is move to the second host system and execution of the relocated virtual machine is resumed.

6. The virtualized distributed computing system of claim 5 wherein, when the relocated virtual machine accesses a shared memory page that is mapped to the first host system, following resumption of execution of the relocated virtual machine, the contents of the shared memory are obtained by the virtualization layer second host system and placed in the physical memory of the second host system through the remote-data memory access interface to the network-interface controller on the second host system.

7. The virtualized distributed computing system of claim 6 wherein, when the relocated virtual machine attempts to write a value to a shared memory page that is mapped to the first host system, following resumption of execution of the relocated virtual machine, the shared memory page is changed to be a non-shared memory page on the second host system and a remote reference count within a shared-memory-page data structure within the first host system is decremented.

8. A method that effects a live-virtual-machine migration within a virtualized distributed computing system, the virtualized distributed computing system including a first host system that includes one or more processors, one or more memories, and a management-server agent, the first host system executing an original virtual machine and interconnected with a management server through a network, a second host system that includes one or more processors, one or more memories, and a management-server agent, the second host system interconnected with the first host system and the management server through the network, and the management server, which coordinates a live-virtual-machine migration operation that moves the original virtual machine to the second host system, the method comprising:
- moving an execution image of the virtual machine from the first host system to the second host system;
- moving swap files of the virtual machine from the first host system to the second host system;
- moving shared-memory-page and non-shared-memory-page lists for the virtual machine from the first host system to the second host system;
- moving modified physical-memory pages to which guest physical pages of the virtual machine are mapped from the first host system to the second host system;
- terminating execution of the original virtual machine on the first host system; and
- resuming execution of the relocated virtual machine on the second host computer.

9. The method of claim 8 wherein the original virtual machine is moved from the first host system to become a relocated virtual machine executing on the second host system with minimal interruption in execution, on the order of less than one to three seconds.

10. The method of claim 8 wherein moving modified physical-memory pages to which guest physical pages of the virtual machine are mapped from the first host system to the second host system further comprises moving, through the remote-data memory access interface to a network-interface controller on one or both of the first and second host systems, modified non-shared physical-memory pages to which guest physical pages of the virtual machine are mapped from the first host system to the second host system.

11. The method of claim 10 wherein each shared memory page is described by a shared-memory-page data structure.

12. The method of claim 11 wherein each shared-memory-page data structure includes:
- a local reference count that indicates the number of virtual machines within the host computer system in which the shared-memory-page data structure is stored;
- a reference to a list of virtual-page-number data structures, each virtual-page-number data structure including indications of the virtual machine and the virtual page number for the shared memory page described by the shared-memory-page data structure in the address space of the guest operating system of the virtual machine;
- a remote reference count that indicates the number of virtual machines within host systems remote to the host computer system in which the shared-memory-page data structure is stored;
- a reference to a list of virtual-page-number data structures, each virtual-page-number data structure including indications of the virtual machine and the virtual page number for the shared memory page described by the shared-memory-page data structure in the address space of the guest operating system of the virtual machine.

13. The method of claim 10 wherein shared physical-memory pages to which guest physical pages of the virtual machine are mapped remain mapped to the physical memory of the first host system during and after the original virtual machine is move to the second host system and execution of the relocated virtual machine is resumed.

14. The method of claim 13 wherein, when the relocated virtual machine accesses a shared memory page that is mapped to the first host system, following resumption of execution of the relocated virtual machine, the contents of the shared memory are obtained by the virtualization layer second host system and placed in the physical memory of the second host system through the remote-data memory access interface to the network-interface controller on the second host system.

15. The method of claim 13 wherein, when the relocated virtual machine attempts to write a value to a shared memory page that is mapped to the first host system, following resumption of execution of the relocated virtual machine, the shared memory page is changed to be a non-shared memory page on the second host system and a remote reference count within a shared-memory-page data structure within the first host system is decremented.

16. A physical data-storage device that contains computer instructions that, when executed within a virtualized distributed computing system, effects a live-virtual-machine migration within the virtualized distributed computing system, the virtualized distributed computing system including a first host system that includes one or more processors, one or more memories, and a management-server agent, the first host system executing an original virtual machine and interconnected with a management server through a network, a second host system that includes one or more processors, one or more memories, and a management-server agent, the second host system interconnected with the first host system and a management server through the network, and a management server, which coordinates a live-virtual-machine migration operation that moves the original virtual machine to the second host system, the live-virtual-machine migration effected by:
- moving an execution image of the virtual machine from the first host system to the second host system;
- moving swap files of the virtual machine from the first host system to the second host system;
- moving shared-memory-page and non-shared-memory-page lists for the virtual machine from the first host system to the second host system;
- moving modified physical-memory pages to which guest physical pages of the virtual machine are mapped from the first host system to the second host system;
- terminating execution of the original virtual machine on the first host system; and
- resuming execution of the relocated virtual machine on the second host computer.

17. The physical data-storage device of claim 16 wherein the original virtual machine is moved from the first host system to become a relocated virtual machine executing on the second host system with minimal interruption in execution, on the order of less than one to three seconds.

18. The physical data-storage device of claim 17 wherein moving modified physical-memory pages to which guest physical pages of the virtual machine are mapped from the first host system to the second host system further comprises moving, through the remote-data memory access interface to a network-interface controller on one or both of the first and second host systems, modified non-shared physical-memory pages to which guest physical pages of the virtual machine are mapped from the first host system to the second host system.

* * * * *